(12) United States Patent
Nosrati et al.

(10) Patent No.: US 10,872,602 B2
(45) Date of Patent: Dec. 22, 2020

(54) TRAINING OF ACOUSTIC MODELS FOR FAR-FIELD VOCALIZATION PROCESSING SYSTEMS

(71) Applicant: Dolby Laboratories Licensing Corporation, San Francisco, CA (US)

(72) Inventors: Hadis Nosrati, Queens Park (AU); David S. McGrath, Rose Bay (AU); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 46 days.

(21) Appl. No.: 16/402,043

(22) Filed: May 2, 2019

(65) Prior Publication Data

US 2019/0362711 A1  Nov. 28, 2019

Related U.S. Application Data

(60) Provisional application No. 62/676,095, filed on May 24, 2018.

(30) Foreign Application Priority Data

Sep. 24, 2018  (EP) .................................... 18196349

(51) Int. Cl.
*G10L 15/00* (2013.01)
*G06F 17/20* (2006.01)
(Continued)

(52) U.S. Cl.
CPC ............ *G10L 15/187* (2013.01); *G06F 17/18* (2013.01); *G06N 20/10* (2019.01);
(Continued)

(58) Field of Classification Search
CPC ......... G06F 17/18; G06N 20/10; G10L 15/06; G10L 15/187; G10L 15/20;
(Continued)

(56) References Cited

U.S. PATENT DOCUMENTS 7,475,014 B2 * 1/2009 Smaragdis ............ G10L 21/028
381/17
8,082,147 B2  12/2011 Parthasarathy
(Continued)

FOREIGN PATENT DOCUMENTS

WO  2017/072118  5/2017

OTHER PUBLICATIONS

Xiong, W. et al "The Microsoft 2017 conversational speech recognition system", ICASSP, 2017.
(Continued)

*Primary Examiner* — Khai N. Nguyen

(57) ABSTRACT

Computer-implemented methods for training an acoustic model for a far-field utterance processing system are provided. The acoustic model may be configured to map an input audio signal into linguistic or paralinguistic units. The training may involve imparting far-field acoustic characteristics upon near-field training vectors that include a plurality of near-microphone utterance signals. Imparting the far-field acoustic characteristics may involve generating a plurality of simulated room impulse responses, convolving one or more of the simulated room impulse responses with the near-field training vectors, to produce a plurality of simulated far-field utterance signals and saving the results of the training in one or more non-transitory memory devices corresponding with the acoustic model. Generating simulated room impulse responses may involve simulating room reverberation times but not simulating early reflections from room surfaces.

18 Claims, 15 Drawing Sheets

(51) Int. Cl.

| | |
|---|---|
| *G10L 15/28* | (2013.01) |
| *G10L 15/187* | (2013.01) |
| *G06N 20/10* | (2019.01) |
| *G06F 17/18* | (2006.01) |
| *G10L 21/0232* | (2013.01) |
| *H04R 3/04* | (2006.01) |
| *G10L 15/08* | (2006.01) |
| *G10L 21/0208* | (2013.01) |

(52) U.S. Cl.
CPC ............ *G10L 21/0232* (2013.01); *H04R 3/04* (2013.01); *G10L 2015/088* (2013.01); *G10L 2021/02082* (2013.01)

(58) Field of Classification Search
CPC ..... G10L 2015/088; G10L 2021/02082; G10L 21/003; G10L 21/0232; H04R 3/04
USPC ............................................ 704/1, 231, 255
See application file for complete search history.

(56) References Cited

U.S. PATENT DOCUMENTS

| | | | |
|---|---|---|---|
| 9,293,134 B1* | 3/2016 | Saleem | G10L 15/26 |
| 9,615,171 B1 | 4/2017 | O'Neill | |
| 10,062,374 B2* | 8/2018 | Xiao | G10L 15/063 |
| 10,096,321 B2* | 10/2018 | Cilingir | G10L 17/20 |
| 10,347,241 B1* | 7/2019 | Meng | G10L 15/063 |
| 10,629,194 B2* | 4/2020 | Song | G10L 15/20 |
| 2005/0010410 A1 | 1/2005 | Takiguchi | |
| 2007/0033045 A1* | 2/2007 | Smaragdis | G10L 21/028 |
| | | | 704/256.7 |
| 2011/0317522 A1 | 12/2011 | Florencio | |
| 2014/0286497 A1* | 9/2014 | Thyssen | H04R 3/005 |
| | | | 381/66 |
| 2014/0355794 A1 | 12/2014 | Morrell | |
| 2015/0294041 A1* | 10/2015 | Yeh | G06F 30/20 |
| | | | 703/2 |
| 2016/0019884 A1* | 1/2016 | Xiao | G10L 15/063 |
| | | | 704/232 |
| 2016/0027435 A1 | 1/2016 | Pinto | |
| 2016/0253994 A1 | 9/2016 | Panchapagesan | |
| 2016/0345116 A1 | 11/2016 | Yen | |
| 2017/0019746 A1 | 1/2017 | Oh | |
| 2017/0245081 A1 | 8/2017 | Lyren | |
| 2017/0278513 A1 | 9/2017 | Li | |
| 2017/0295445 A1 | 10/2017 | Christoph | |
| 2018/0053512 A1* | 2/2018 | Cilingir | G10L 21/0208 |
| 2018/0330726 A1* | 11/2018 | Song | H04R 3/005 |
| 2019/0362711 A1* | 11/2019 | Nosrati | G06N 20/10 |

OTHER PUBLICATIONS

Kim, C. et al. "Generation of large-scale simulated utterances in virtual rooms to train deep-neural networks for far-field speech recognition in Google Home", Interspeech, Aug. 20-24, 2017, pp. 379-383.

Berkun, R. et al "Microphone Array Power Ratio for Quality Assessment of Reverberated Speech" EURASIP Journal on Advances in Signal Processing, Jun. 18, 2015.

Sivasankaran, S. et al "A Combined Evaluation of Established and New Approaches for Speech Recognition in Varied Reverberation Conditions" Elsevier, Computer Speech & Language, vol. 46, Nov. 2017, pp. 144-460.

Porschmann, C. et al "Binauralization of Omnidirectional Room Impulse Responses Algorithm and Technical Evaluation" Google Scholar, Sep. 5-9, 2017.

Vaananen, Riitta "Efficient Modeling and Simulation of Room Reverberation" Jun. 3, 1997, Espoo, Finland.

Campbell, Joseph P. "Speaker Recognition: A Tutorial" IEEE, vol. 85, No. 9, pp. 1437-1462, Sep. 1997.

Kepuska, V.Z. et al "A Novel Wake-up-word Speech Recognition System, wake-up-word Recognition Task, Technology and Evaluation" Nonlinear Analysis, Theory, Methods & Applications, vol. 71, Issue 12, Dec. 15, 2009, pp. e2772-e2789.

Vogt, T. et al "Automatic Recognition of Emotions from Speech: A Review of the Literature and Recommendations for Practical Realisation: Affect and Emotion in Human-Computer Interaction" pp. 75-91, 2008.

Hagen, A. et al "Recent Advances in the Multi-Stream HMM/ANN Hybrid Approach to Noise Robust Asr" Computer Speech & Language, Jan. 2005, vol. 19, No. 1, pp. 3-30.

* cited by examiner

FIGURE 5A
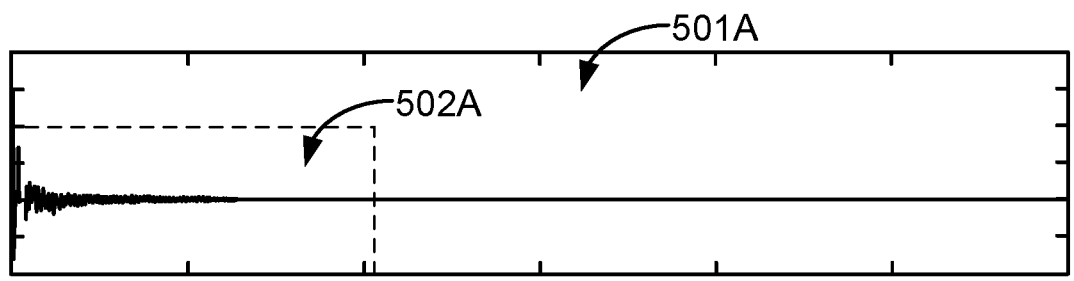
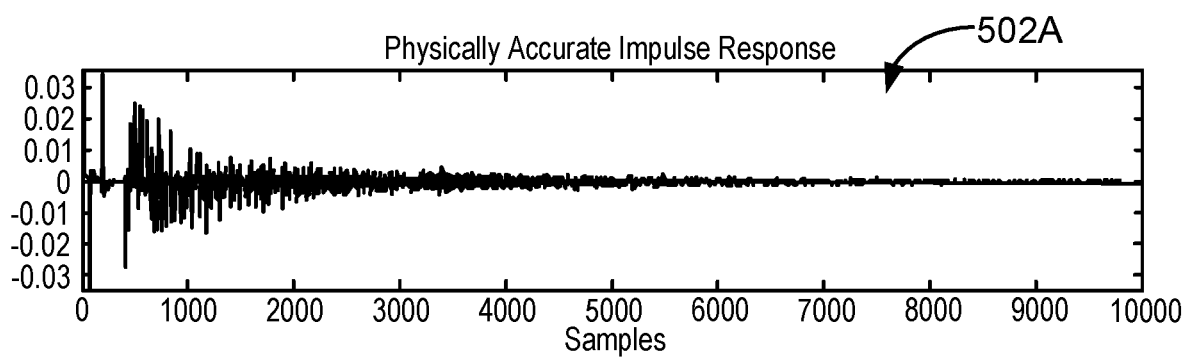
FIGURE 5B

- × Receiving point
- ○ Sound source
- ● Image source

FIGURE 6A
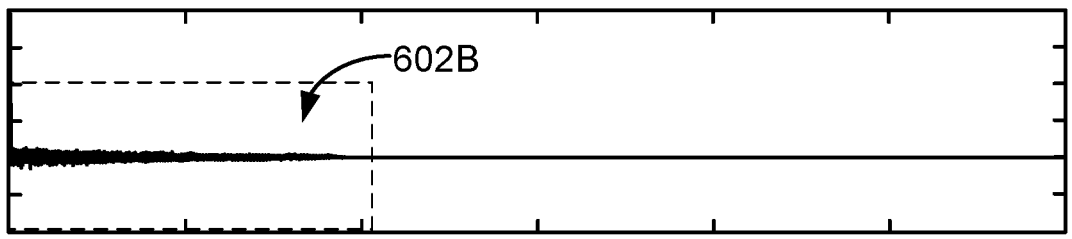
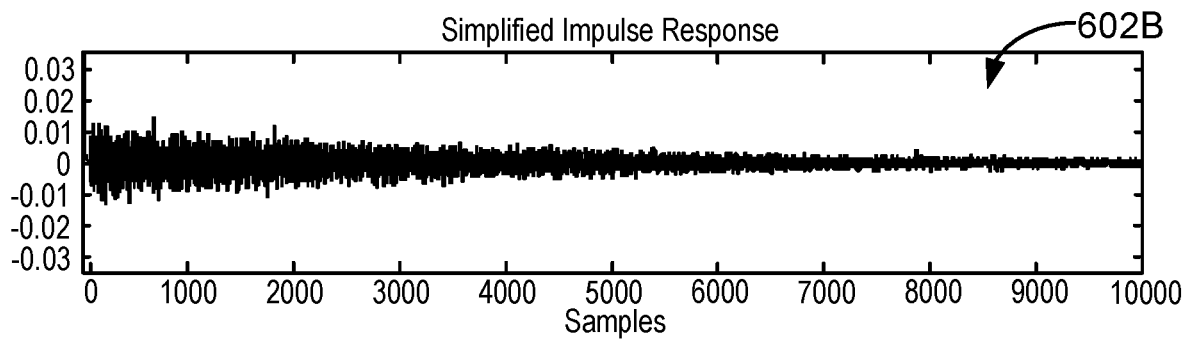
FIGURE 6B

TRAINING OF ACOUSTIC MODELS FOR FAR-FIELD VOCALIZATION PROCESSING SYSTEMS

CROSS REFERENCE TO RELATED APPLICATIONS

This application claims priority U.S. Provisional Application No. 62/676,095, filed May 24, 2018 and European Patent Application No. 18196349.7, filed Sep. 24, 2018, each of which is incorporated by reference in its entirety.

TECHNICAL FIELD

This disclosure relates to the processing of audio signals. In particular, this disclosure relates to processing audio data that corresponds to far-field vocalizations.

BACKGROUND

Far-field vocalization processing, including but not limited to automatic far-field speech recognition, involves situations wherein the talker is not in close proximity to the microphone(s). Processing such vocalizations is challenging because the speech signals can be degraded considerably by reverberation and noise. Improved methods and systems would be desirable.

SUMMARY

Various audio processing methods are disclosed herein. Some methods may be computer-implemented, e.g., via a control system. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. In some implementations the control system may include one or more processors and one or more non-transitory storage media operatively coupled to the one or more processors.

Some such methods may involve training an acoustic model for a far-field vocalization processing system. The acoustic model may be configured to map an input audio signal into linguistic or paralinguistic units. According to some implementations, the training may involve imparting far-field acoustic characteristics upon near-field training vectors. In some examples, the near-field training vectors may include a plurality of near-microphone vocalization signals.

According to some such examples, imparting the far-field acoustic characteristics may involve generating, by the control system, a plurality of simulated room models. In some implementations, generating the simulated room models may involve simulating diffuse room reverberation but not simulating individual early reflections from room surfaces. In some examples, generating the simulated room models may involve simulating room impulse responses corresponding to a diffuse sound that decays over time according to a reverberation time. In some examples, imparting the far-field acoustic characteristics may involve imparting, via the control system, one or more of the simulated room models on the near-field training vectors, to produce a plurality of simulated far-field vocalization signals. Some such methods may involve saving the plurality of simulated far-field vocalization signals of the training in one or more non-transitory memory devices corresponding with the acoustic model.

In some implementations, the room models may include room impulse responses. According to some such implementations, the imparting may involve time-domain convolution of the impulse responses with the near-field training vectors. However, in some such examples the imparting may involve frequency-domain convolution of the impulse responses with the near-field training vectors.

According to some examples, imparting the far-field acoustic characteristics may involve receiving, by the control system, near-microphone vocalization signals and applying, by the control system, a filter bank to the near-microphone vocalization signals to produce a plurality of features. Each feature may, for example, correspond to a different frequency band of the near-microphone vocalization signals. Some such methods may involve modifying, by the control system, original frequency band energies of each feature to produce modified features that represent energy contours of far-field vocalization signals across frequency bands and providing the modified features to an acoustic modeling estimation process that is implemented by the control system. The acoustic modeling estimation process may be configured to generate phoneme sequences, or sequences of other linguistic or paralinguistic units, corresponding to the near-field vocalization signals.

According to some examples, modifying the original frequency band energies of each feature may involve applying one or more delay operators to original frequency band energies of each feature. In some implementations, modifying the original frequency band energies of each feature may involve generating delayed and attenuated replicates of original frequency band energies of each feature. Some such methods may involve applying one or more addition operators to the delayed and attenuated replicates. Generating the attenuated replicates may, for example, involve determining a gain based a reverberation time, a distance between a source and a microphone, a length of a time frame and/or a room size.

In some examples, the far-field vocalization processing system may include a far-field speech recognition system, a far-field speaker recognition system, a wakeword detection system, and/or an emotion recognition system. According to some implementations, training the acoustic model may involve changing a physical state of at least one non-transitory memory device location corresponding with a near-field training vector.

According to some implementations, training the acoustic model may involve extracting, via a speech analysis process implemented by the control system, features from the simulated far-field vocalization signals. Some such methods may involve providing extracted features to an acoustic modeling estimation process configured to generate phoneme sequences, or sequences of other linguistic or paralinguistic units, corresponding to the simulated far-field vocalization signals. In some examples, the control system may implement the acoustic modeling estimation process according to a Hidden Markov model, a Gaussian mixture model and/or a neural network.

In some examples, the far-field vocalization processing system may include a far-field speech recognition system. Such methods may involve implementing the far-field speech recognition system by implementing, via the control system, an acoustic model trained according to any of the methods disclosed herein. Some such methods may involve implementing, via the control system, a pronunciation model by mapping linguistic units produced by the acoustic model into words according to a pronunciation dictionary. Some such methods may involve implementing, via the control system, a language model by estimating a probability of a word given a previous word sequence produced by the pronunciation model. According to some such examples, implementing the far-field speech recognition system also may involve receiving, by the control system, far-field speech and producing, via the control system, a transcript corresponding to the far-field speech.

As noted above, in some examples the far-field vocalization processing system may include a far-field talker recognition system, a wakeword detection system or an emotion recognition system. Such methods may involve implementing the far-field speech recognition system by implementing, via the control system, an acoustic model trained according to any of the methods disclosed herein.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as those disclosed herein. The software may, for example, include instructions for performing one or more of the methods disclosed herein.

At least some aspects of the present disclosure may be implemented via apparatus. For example, one or more devices may be configured for performing, at least in part, the methods disclosed herein. In some implementations, an apparatus may include an interface system and a control system. The interface system may include one or more network interfaces, one or more interfaces between the control system and a memory system, one or more interfaces between the control system and another device and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

According to some such examples, the apparatus may include an interface system and a control system. The control system may, for example, be configured for performing one or more of the methods disclosed herein.

In some such implementations, the control system may be configured to implement an acoustic model trained according to one of the methods one or more of the methods disclosed herein. According to some such implementations, the control system may be configured for implementing a far-field speech recognition system by receiving, via the interface system, an audio signal corresponding to far-field speech and mapping, via the acoustic model, the audio signal into phonemes. In some such examples, the control system may be configured for mapping, via a pronunciation model and a language model, the phonemes into words and for outputting a representation of the words, such as a transcript.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

BRIEF DESCRIPTION OF THE DRAWINGS

FIG. 5A is a graph that represents simulated RIRs based on direct sounds, early reflections and late reflections of sounds for a particular room.

FIG. 5B shows an enlarged version of area 502A of FIG. 5A.

FIG. 6A is a graph that represents one example of a simplified RIR based on direct sounds, but not on reflected sounds of a particular room.

FIG. 6B shows an enlarged version of area 602B of FIG. 6A.

DESCRIPTION OF EXAMPLE EMBODIMENTS

Figure 1A:
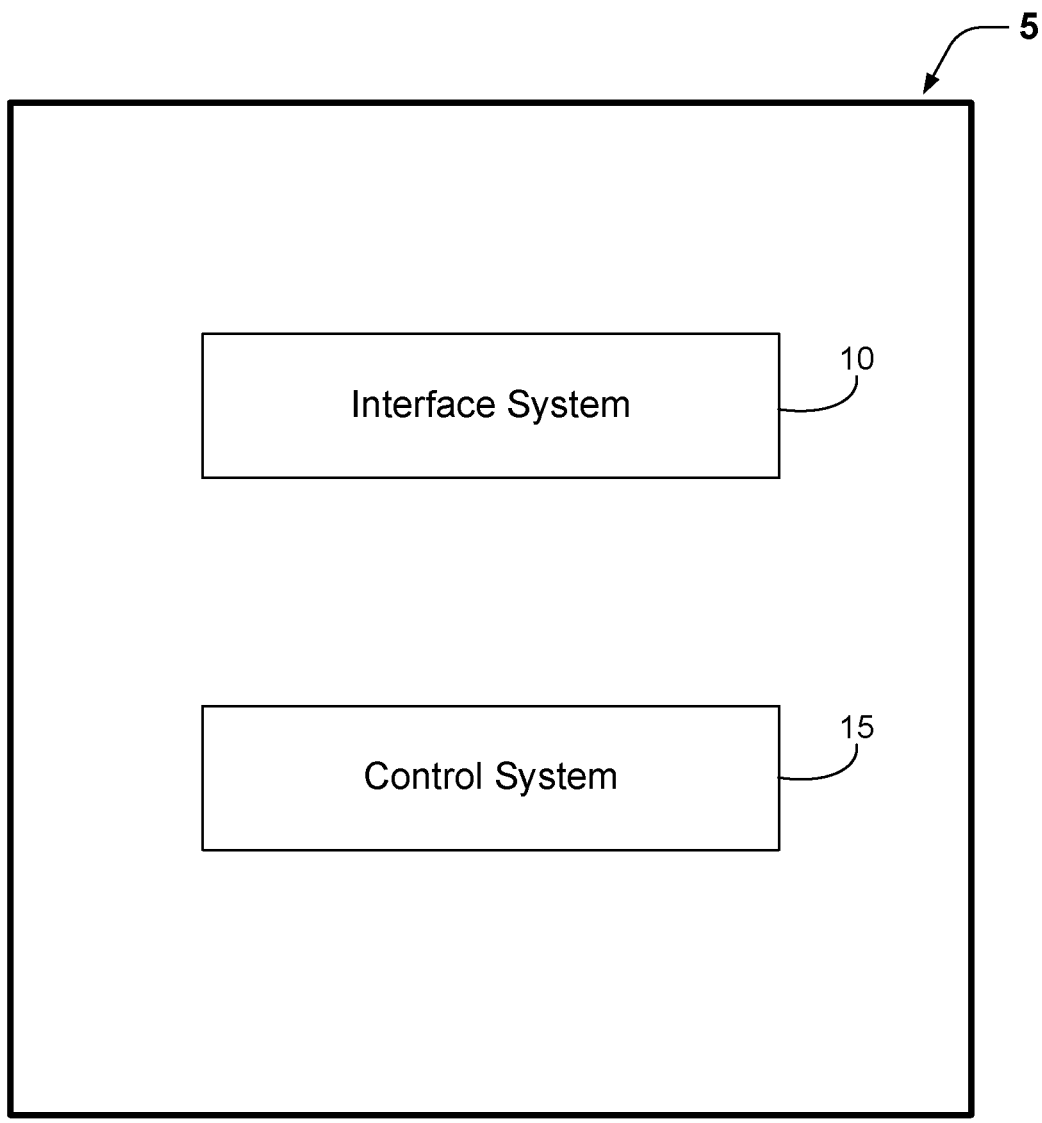
FIG. 1A is a block diagram that shows examples of components of an apparatus that may be configured to perform at least some of the methods disclosed herein.

The following description is directed to certain implementations for the purposes of describing some innovative aspects of this disclosure, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

Automatic speech recognition has improved significantly in recent years. Some types of automatic speech recognition have achieved parity with the abilities of human beings in terms of processing conversational speech signals. However, far-field speech recognition, wherein the talker is not in close proximity to the microphones, remains a challenge.

The popularity of automatic smart home devices such as Amazon Echo™ and Google Home™ has brought increased attention to methods for building acoustic models that can capture the room acoustic variables of far-field speech signals for processing far-field vocalizations. Examples of far-field vocalization processing include far-field speech recognition, far-field wakeword detection, far-field speaker recognition and far-field emotion recognition.

Automatic speaker recognition is the use of a machine to recognize a person from a spoken phrase. Identifying a speaker can simplify the task of translating speech in systems that have been trained on a specific person's voice. Alternatively, or additionally, automatic speaker recognition may be used to authenticate or verify the identity of a speaker as part of a security process. Accordingly, some automatic speaker recognition systems may be capable of identifying a particular person and some automatic speaker recognition systems may be capable of verifying (at least in part) a person's claimed identity. Relevant methods are described in J. P. Campbell, "Speaker Recognition: a Tutorial" (Proc. IEEE, vol. 85, no. 9, pp. 1437-1462, (September 1997)), which is hereby incorporated by reference.

Wakeword detection (also known as "wake-up-word detection") involves the detection of a single word or phrase when spoken in the alerting context of requesting attention, while rejecting all other words, phrases, sounds, noises and other acoustic events. Relevant methods are described in V. Z. Këpuska and T. B. Klein, "A novel wake-up-word speech recognition system, wake-up-word recognition task, technology and evaluation" (Nonlinear Analysis, Theory, Methods & Applications" 71, e2772-e2789, (2009)), which is hereby incorporated by reference.

A related field of study is emotion recognition from speech, which involves differentiating between "opposing" emotional states using vocal cues. Emotion recognition may, for example, involve recognizing and/or differentiating happiness, anger, boredom, fear and a neutral emotional state. However, emotion recognition may involve recognizing and/or differentiating different emotional states, depending on the particular application. Relevant methods are described in T. Vogt, E. Andre, and J. Wagner, "Automatic Recognition of Emotions from Speech: A Review of the Literature and Recommendations for Practical Realization: affect and emotion in human computer interaction" (Springer, pp. 75-91 (2008)), which is hereby incorporated by reference.

Accordingly, the present inventors have researched various methods of processing audio data that corresponds to far-field vocalizations. For example, the present inventors have researched various methods for improving automatic far-field speech recognition. The inventors have found that conventional acoustic modeling approaches using near-microphone speech signals perform poorly on far-field speech data due to the mismatch between training and test conditions. The inventors have also determined that generating realistic room impulse responses for particular room characteristics can be cumbersome, computationally expensive and inefficient.

This application discloses novel techniques for simulating room impulse responses that generalize to various room acoustics and that can be implemented relatively more efficiently than prior methods. In some implementations, such techniques may be further extended to build a feature space far-field acoustic model that can be directly applied in a feature domain. The disclosed methods provide a framework for training acoustic models suitable for far-field vocalization processing, including but not limited to far-field speech recognition.

According to some examples, generating simulated room impulse responses may involve simulating room reverberation times but not simulating early reflections from room surfaces. In some disclosed examples, generating simulated room impulse responses may involve simulating room impulse responses corresponding to a diffuse sound that decays over time. Omitting the room impulse responses based on early reflections from room surfaces is computationally more efficient than prior methods and has nonetheless been found to produce acceptable results. The effectiveness of some such implementations has been evaluated in terms of word error rate. The results of some examples are provided herein and are described below.

FIG. 1A is a block diagram that shows examples of components of an apparatus that may be configured to perform at least some of the methods disclosed herein. In some examples, the apparatus 5 may be, or may include, a personal computer, a desktop computer or other local device that is configured to provide audio processing. In some examples, the apparatus 5 may be, or may include, a server. According to some examples, the apparatus 5 may be a client device that is configured for communication with a server, via a network interface. The components of the apparatus 5 may be implemented via hardware, via software stored on non-transitory media, via firmware and/or by combinations thereof. The types and numbers of components shown in FIG. 1A, as well as other figures disclosed herein, are merely shown by way of example. Alternative implementations may include more, fewer and/or different components.

In this example, the apparatus 5 includes an interface system 10 and a control system 15. The interface system 10 may include one or more network interfaces, one or more interfaces between the control system 15 and a memory system and/or one or more external device interfaces (such as one or more universal serial bus (USB) interfaces). In some implementations, the interface system 10 may include a user interface system. The user interface system may be configured for receiving input from a user. In some implementations, the user interface system may be configured for providing feedback to a user. For example, the user interface system may include one or more displays with corresponding touch and/or gesture detection systems. In some examples, the user interface system may include one or more microphones and/or speakers. According to some examples, the user interface system may include apparatus for providing haptic feedback, such as a motor, a vibrator, etc. The control system 15 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some examples, the apparatus 5 may be implemented in a single device. However, in some implementations, the apparatus 5 may be implemented in more than one device. In some such implementations, functionality of the control system 15 may be included in more than one device. In some examples, the apparatus 5 may be a component of another device.

Figure 1B:
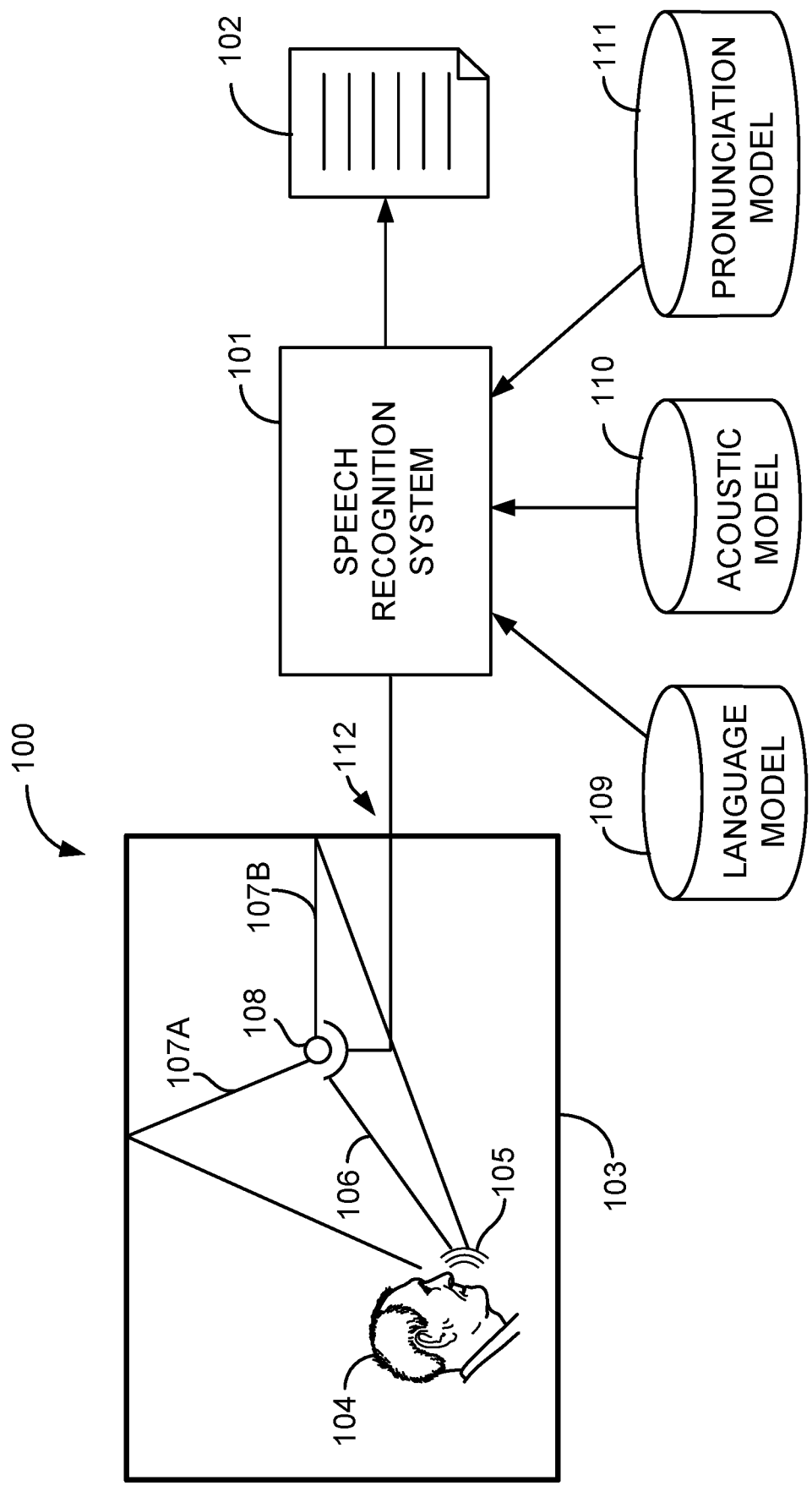
FIG. 1B shows blocks of an automatic speech recognition system and related elements according to one example.

FIG. 1B shows blocks of an automatic speech recognition system and related elements according to one example. According to some examples, the elements of the automatic speech recognition system 101 may be implemented via one or more control systems such as the control system 15. In this example, the automatic speech recognition system 101 is configured to map an input audio signal into a transcript 102.

Here, the input audio signal includes far-field vocalization signals 112. In this example, far-field vocalizations 105 are captured by one or more microphones 108 that are disposed within the room 103. The one or more microphones 108 capture sounds including vocalizations 105 from a talker 104. The vocalizations 105 may include speech and non-speech vocalizations such as filler sounds, grunts, aspirations, etc. Because the talker 104 is not close to the microphone(s) 108, the one or more microphones 108 capture a combination of direct sound 106 and reflected sound (including but not limited to reflected sound 107A and 107B) from surfaces of the room 103.

Accordingly, the far-field vocalization signals 112 provided by the microphone(s) 108 include signals corresponding to direct and reflected sounds. Some far-field vocalization processing techniques consider the sound reflections individually based on a source-reflection model. Some such methods are disclosed in C. Kim, et. al, "Generation of large-scale simulated utterances in virtual rooms to train deep-neural networks for far-field speech recognition in Google Home" (Interspeech, pp. 379-383 (2017)), which is hereby incorporated by reference. However, some alternative methods disclosed herein involve generating room impulse responses wherein reflected sounds are statistically simulated.

According to this example, the automatic speech recognition system 101 includes a language model 109, an acoustic model 110 and a pronunciation model 111. An acoustic model is used in automatic speech recognition to represent the relationship between an audio signal and the phonemes or other linguistic units that make up speech. An acoustic model may be learned from a set of audio recordings and their corresponding transcripts. In this example, the acoustic model 110 is configured to map input far-field vocalization signals 112 into phonemes or other linguistic units. The model may be built using a set of audio recordings and their corresponding transcripts. In some implementations, the acoustic model 110 may be configured to map input far-field vocalization signals 112 into paralinguistic units or features. Paralinguistic features may, for example, indicate vocal effects commonly referred to as "tone of voice." This disclosure provides novel methods for training the acoustic model 110.

The pronunciation model 111 is configured to map phonemes (or other linguistic units or paralinguistic units), which are output by the acoustic model 110, into words according to a pronunciation dictionary. In this example, the language model 109 is configured to estimate the probability of a word given the word sequence that has already been observed. The language model 109 provides context to distinguish between words and phrases that sound similar. For example, in American English, the phrases "wreck a nice beach" and "recognize speech" have similar pronunciations but very different meanings. Such ambiguities are easier to resolve when input from the language model 109 is incorporated with input from the acoustic model 110 and the pronunciation model 111.

Figure 2A:
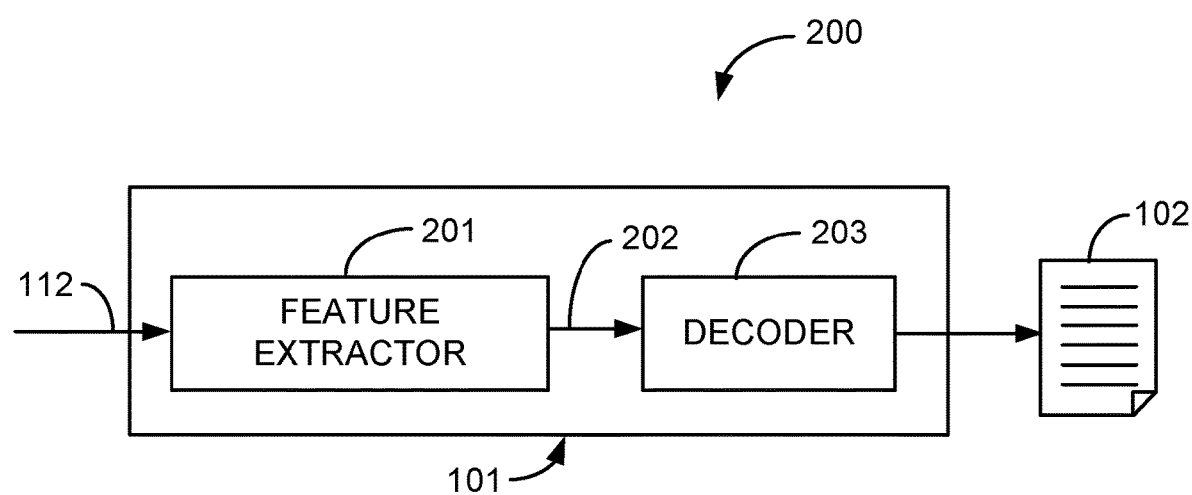
FIG. 2A is a block diagram that shows example elements of a far-field vocalization processing system.

FIG. 2A is a block diagram that shows example elements of a far-field vocalization processing system. The blocks of FIG. 2A may, for example, be implemented via a control system such as the control system 15. In this example, the far-field vocalization processing system is configured to provide automatic speech recognition functionality. Here, the automatic speech recognition system 101 includes a feature extractor 201 and a decoder 203. The feature extractor 201 is configured for extracting features from the far-field vocalization signals 112.

In this example, the feature extractor 201 is configured for extracting linguistic features 202 from the far-field vocalization signals 112. For example, the linguistic features may include intensity features, linear predictive coding (LPC) features, perceptional linear predictive coefficients (PLP), mel-frequency cepstral coefficients (MFCC), linear prediction cepstral coefficients (LPCC), wavelet-based features, i-vectors and/or non-negative matrix factorization features. In some implementations, the feature extractor 201 may be configured for extracting multiple types of linguistic features 202. Relevant methods are described in A. Hagen and A. Morris, "Recent advances in the multi-stream HMM/ANN hybrid approach to noise robust ASR" (Computer Speech and Language, vol. 19, no. 1, pp. 3-30, (2005)), which is hereby incorporated by reference.

Linguistic features are relevant to automatic speech recognition systems because such systems are configured to transcribe a linguistic message. Here, the decoder 203 is configured for converting the linguistic features 202 into the transcript 102. The decoder 203 may, in some implementations, be configured for Viterbi decoding, which is also known as forward dynamic programming. In other examples, the decoder 203 may be implemented via connectionist temporal classification (CTC), a recurrent neural network (RNN), a convolutional neural network (CNN), a long short-term memory (LSTM) network, and/or a bidirectional long short-term memory (BLSTM) network. The transcript 102 may be any convenient representation of a sequence of words output by the decoder 203.

In some implementations of the far-field vocalization processing system, the feature extractor 201 may be configured for extracting acoustic features. Such acoustic features may, for example, be relevant for the classification of non-verbal vocalizations such as laughter or sighs. Such acoustic features may be useful input if the far-field vocalization processing system is configured for emotion recognition and/or for speaker recognition.

Figure 2B:
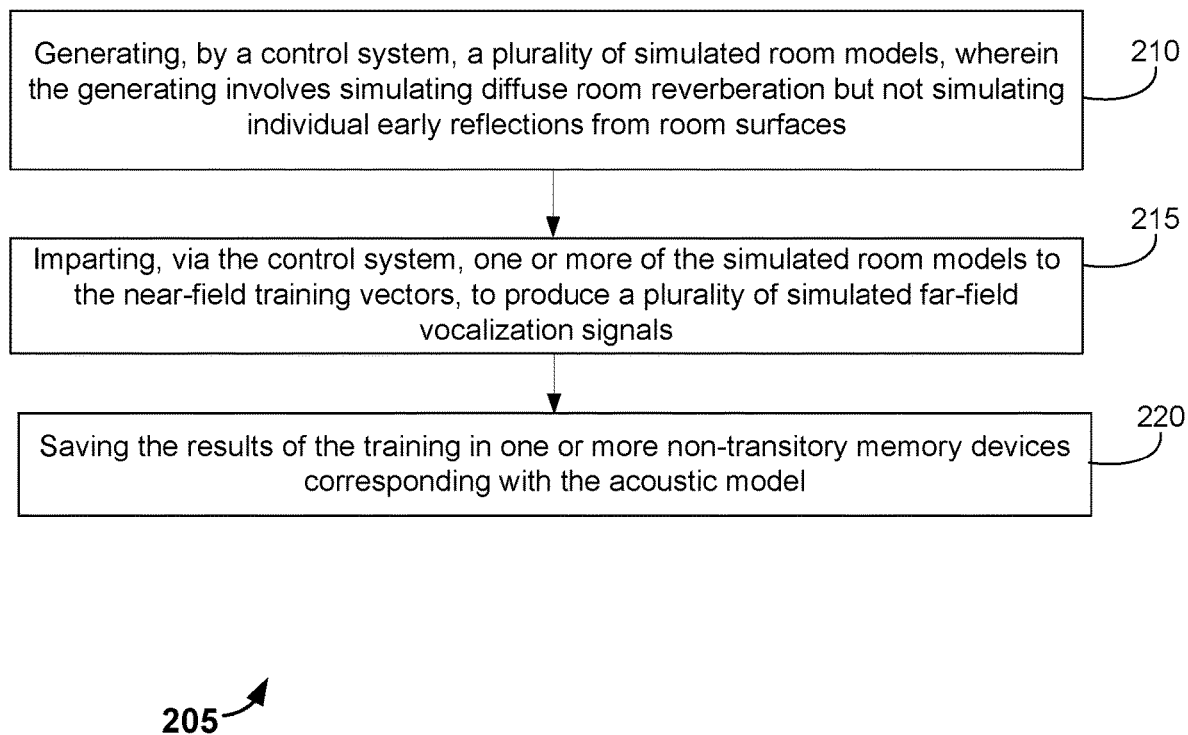
FIG. 2B is a flow diagram that shows blocks of a far-field vocalization processing method.

FIG. 2B is a flow diagram that shows blocks of a far-field vocalization processing method. The far-field vocalization processing method may, for example, be implemented by control system (such as the control system 15) that includes one or more processors and one or more non-transitory memory devices. In this example, the method involves training an acoustic model for a far-field vocalization processing system. The far-field vocalization processing system may include a far-field speech recognition system, a far-field speaker recognition system, a wakeword detection system and/or an emotion recognition system, depending on the particular implementation. In this implementation, the acoustic model is configured to map an input audio signal into linguistic or paralinguistic units.

Training the acoustic model may involve one or more types of machine learning that are implemented via the control system. In some instances, the machine learning may be implemented via one or more neural networks, such as a convolutional neural network (CNN) a recurrent neural network (RNN), etc. In some examples, the machine learning may be implemented via an RNN that includes long short-term memory (LSTM) and/or Bidirectional Long Short Term Memory (BLSTM). However, in other implementations the machine learning may be implemented via a hidden Markov/Gaussian mixture model (HMM-GMM) or an HMM/subspace Gaussian mixture (HMM-SGMM) model trained with Viterbi or Baum-Welch training, support vector machines, non-negative matrix factorization, robust principal component analysis, sparse coding, probabilistic latent component analysis, etc.

Here, training the acoustic model involves imparting far-field acoustic characteristics to near-field training vectors. In this example, the near-field training vectors include a plurality of what will be referred to herein as "near-microphone vocalization signals," in order to distinguish these near-field training vectors from far-field vocalization signals such as the far-field vocalization signals 112. The near-microphone vocalization signals may, for example be produced via a microphone that is in relatively close proximity to the mouth of the person making the vocalizations (referred to herein as the talker or the speaker). For example, the talker may be wearing a headset or using a handheld microphone when the near-microphone vocalization signals are produced.

Accordingly, method 205 is an example of a method of training an acoustic model that involves imparting far-field acoustic characteristics to near-microphone vocalization signals. In this example, imparting the far-field acoustic characteristics involves generating, by the control system, a plurality of simulated room models in block 210. According to this implementation, generating the plurality of simulated room models involves simulating diffuse room reverberation but not simulating individual early reflections from room surfaces. Various detailed examples are provided below.

According to this example, block 215 involves imparting, via the control system, one or more of the simulated room models to the near-field training vectors, to produce a plurality of simulated far-field vocalization signals. Here, block 220 involves saving the results of the training, for example, the simulated far-field vocalization signals, in one or more non-transitory memory devices corresponding with the acoustic model.

The imparting process of block 215 may be performed in a variety of ways, depending on the particular implementation. In some implementations, the room models may include, or may be, room impulse responses. According to some such implementations, the imparting process of block 215 may involve time-domain or frequency-domain convolution of the room impulse responses with the near-field training vectors.

Figure 3:
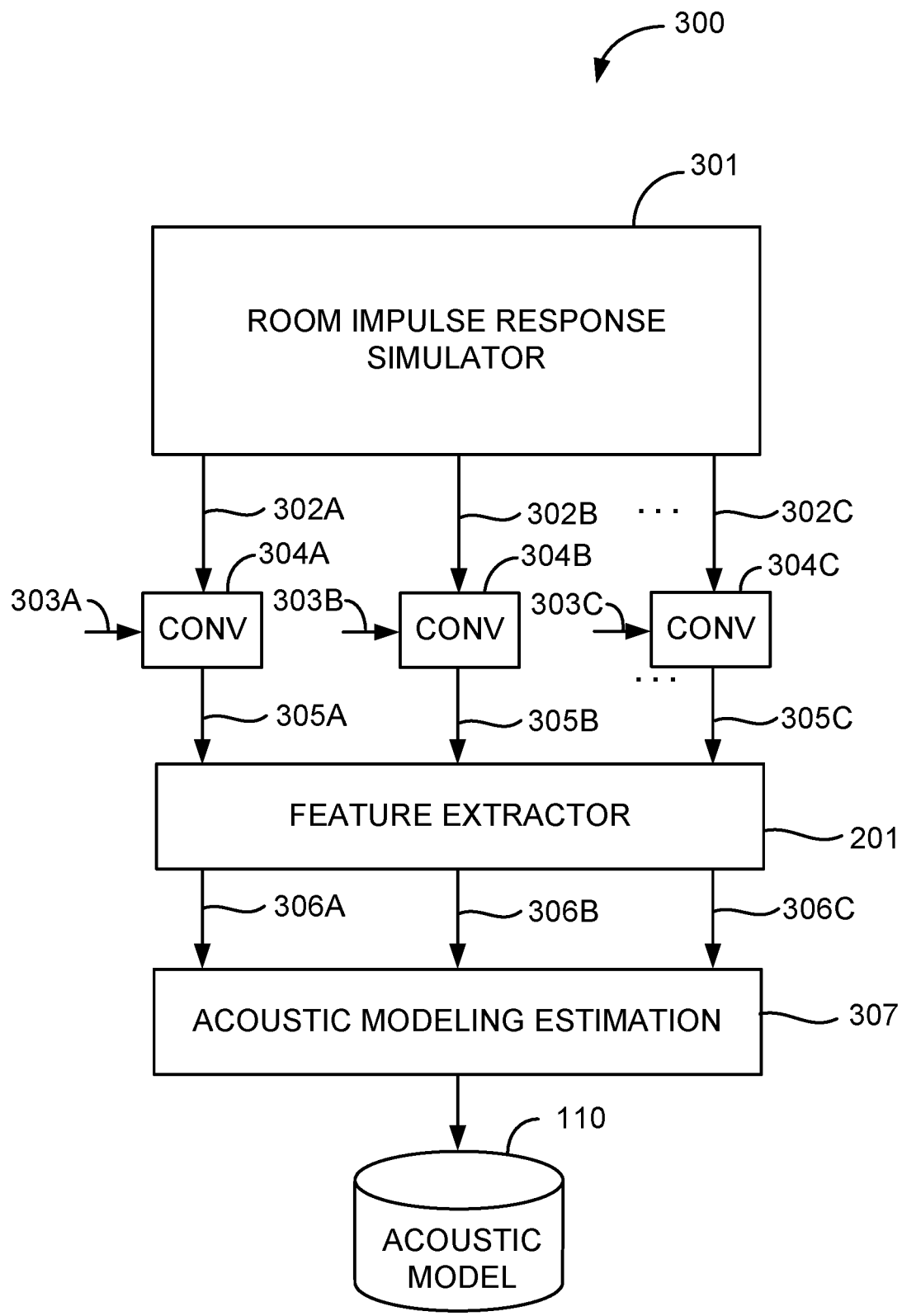
FIG. 3 shows blocks of a method of training an acoustic model for a far-field vocalization processing system wherein the room models include room impulse responses (RIRs).

FIG. 3 shows blocks of a method of training an acoustic model for a far-field vocalization processing system wherein the room models include room impulse responses (RIRs). The blocks of FIG. 3 may, for example, be implemented by a control system (such as the control system 15) that includes one or more processors and one or more non-transitory memory devices. As with other figures disclosed herein, the numbers and types of the elements shown in FIG. 3 are merely made by way of example. For example, although only three room impulse responses, convolution modules and near-microphone speech signals are shown in FIG. 3, some implementations may involve many more of such elements.

In this implementation, the room impulse response simulator 301 generates a plurality of RIRs 302A, 302B and 302C. In this example, the convolution modules 304A, 304B and 304C are configured to convolve the RIRs 302A, 302B and 302C with near-microphone vocalization signals, which are near-microphone speech signals 303A, 303B and 303C in this example. The convolution modules 304A, 304B and 304C may be configured to convolve the RIRs 302A, 302B and 302C with the near-microphone speech signals 303A, 303B and 303C in the time domain or in the frequency domain, depending on the particular implementation.

In this example, the convolution modules 304A, 304B and 304C output the simulated far-field speech signals 305A, 305B and 305C, respectively, to the feature extractor 201. According to this example, the feature extractor 201 is configured for extracting features 306A, 306B and 306C from the simulated far-field speech signals 305A, 305B and 305C. The features 306A, 306B and 306C may include linguistic features and/or acoustic features, e.g., as described above.

In this example, the feature extractor 201 is configured for providing the features 306A, 306B and 306C to the acoustic modeling estimation block 307. According to this implementation, the acoustic modeling estimation block 307 is configured for generating phoneme sequences that correspond to features of a particular simulated far-field speech signal. In some examples, the control system may implement the acoustic modeling estimation block 307 via an HMM, a GMM, a neural network and/or one or more types of machine learning that are described above in the context of training the acoustic model 110. According to this example, the acoustic modeling estimation block 307 is configured to provide acoustic model parameters to the acoustic model 110. Because the process of training the acoustic model 110 may vary according to the particular implementation, the types of acoustic model parameters output by the acoustic modeling estimation block 307 may also vary according to the particular implementation.

Figure 4:
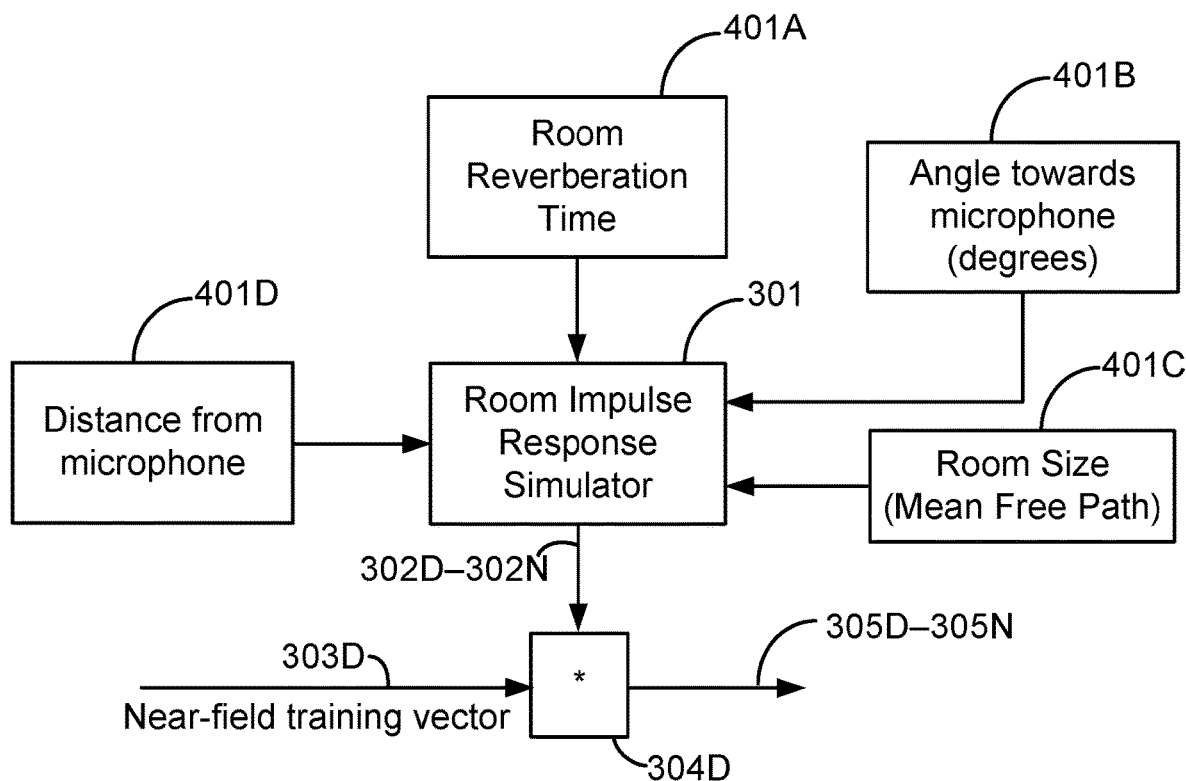
FIG. 4 is a block diagram that illustrates an example of convolving a training vector with a library of simulated RIRs.

FIG. 4 is a block diagram that illustrates an example of convolving a training vector with a library of simulated RIRs. The blocks of FIG. 4 may, for example, be implemented by control system (such as the control system 15) that includes one or more processors and one or more non-transitory memory devices. As with other figures disclosed herein, the numbers and types of the elements shown in FIG. 4 are merely made by way of example.

The room impulse response simulator 301 that is shown in FIG. 4 is one example of the room impulse response simulator 301 of FIG. 3. According to this implementation, the room impulse response simulator 301 generates a plurality of RIRs 302D-302N based on factors that include room reverberation time (401A), the distance from a talker to a microphone (401D), the angle from a talker's speech direction to a microphone (401B) and the size of the room in which the talker is located (401C). The room reverberation time 401 may, for example, be measured as RT60, the time required for reflections of a direct sound to decay by 60 dB. The room size 401C may, for example, be expressed as the mean free path of the room, e.g., according to the following expression:

$$MFP = \frac{4V}{S} \qquad \text{Equation 1}$$

In Equation 1, MFP represents the mean free path, V represents the room volume and S represents the inside surface area of the room.

In this example, N corresponds with an integer that may vary according to the particular implementation. In one implementation, the room impulse response simulator 301 has generated a "library" of 630 RIRs. However, in other implementations the room impulse response simulator 301 may have generated more or fewer RIRs.

In this example, the convolution module 304D is configured to convolve each of the RIRs 302D-302N with a near-field training vector. Accordingly, simulated far-field speech signals 305D-305N may be generated from a single near-field training vector. In FIG. 4, the near-field training vector includes the near-microphone speech signals 303D. The convolution module 304D may be configured to convolve the RIRs 302D-302N with the near-microphone speech signals 303D in the time domain or in the frequency domain, depending on the particular implementation.

Figure 5C:
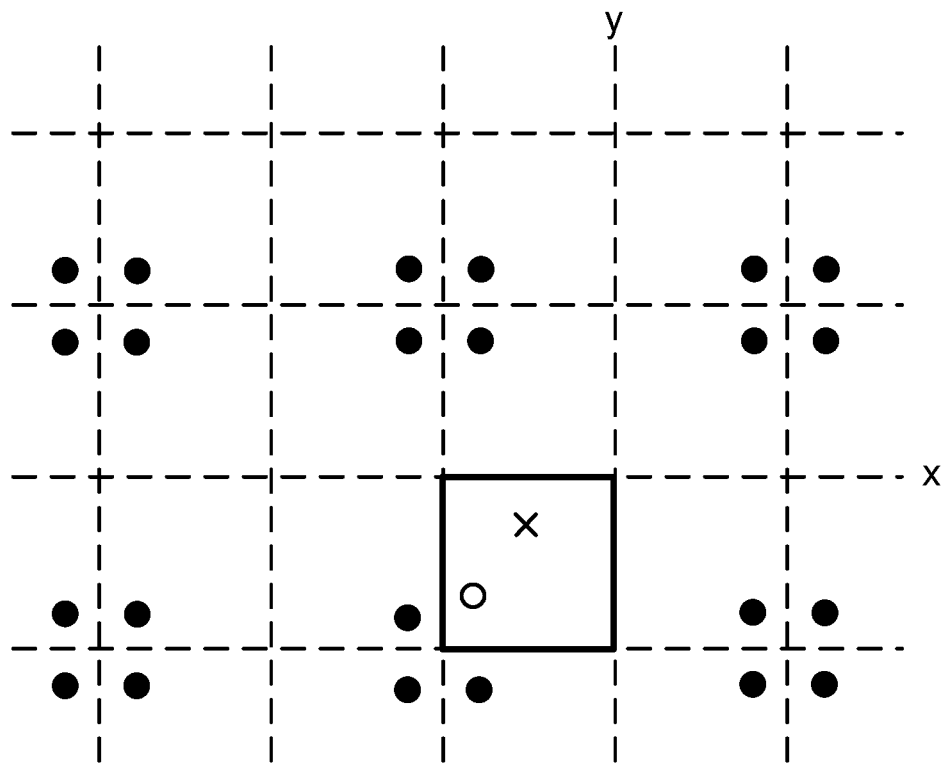
FIG. 5C shows a two-dimensional sectional view of mirror image sources in a rectangular room.

FIG. 5A is a graph that represents simulated RIRs based on direct sounds, early reflections and late reflections of sounds for a particular room. FIG. 5B shows an enlarged version of area 502A of FIG. 5A. In this example, the sound waves from the source are reflected at least once and potentially multiple times in an enclosed room before reaching the receiving point/microphone. Here, early reflections generated by this RIR simulator are sparse in the beginning and dense as the time increases. Accordingly, the reflections are more sparse and distinguishable in the beginning and become less distinctive over time. Examples of how such an RIR simulator may function are provided below with reference to FIG. 5C.

FIG. 5C shows a two-dimensional sectional view of mirror image sources in a rectangular room. The sound waves from the sound source would be reflected at the walls several times in an enclosed room before reaching the receiving point/microphone. Therefore, each reflection may be considered to be coming from a sound source/talker which is mirrored at the wall and may be referred to as an "image" or an "image source." The soundfield may then be described as the combination of the sound waves started at the same time from the original sound source and the image sources.

These reflections will create an RIR like that shown in FIGS. 5A and 5B, where the arrival times of the early reflections are determined by the distance between the sound source and the receiving point/microphone and their respective locations within the room. The reflected sounds may be referred to herein as "reflections" or "echoes." The number of echoes that will have arrived during the time t can be calculated by the number of image sources that can be fitted into the sphere of radius r=ct, wherein c represents the speed of sound. Therefore, the number of echoes can be approximated as the ratio of sphere volume $V_s$ and the room volume V, as follows:

$$n \approx \frac{V_S}{V} = \frac{\frac{4}{3}*\pi(ct)^3}{V} \qquad \text{Equation 2}$$

In Equation 2, n represents the number of echoes that will have arrived during the time t. As the time increases, the density of echoes increases, whereas the energy of the echoes decreases due to the larger distance with the image sources:

$$a_n^2 \approx \frac{\gamma^2}{(ct_n)^2} \qquad \text{Equation 3}$$

In Equation 3, $a_n$ represents the energy at a point in the room and γ represents a constant (e.g., 1). The increased echo density and decreased echo energy with increasing time may be observed in FIGS. 5A and 5B.

Accordingly, the power at a point in a room may be calculated as the number of echoes arriving during a time interval multiplied by the amplitudes of the echoes, e.g., as follows:

$$P_n = a_n^2 \frac{dn}{dt_n} = \frac{4\pi c\gamma^2}{V} \qquad \text{Equation 4}$$

In Equation 4, $P_n$ represents the power at the point in the room and $a_n$ represents the energy at the point in the room.

FIG. 6A is a graph that represents one example of a simplified RIR based on direct sounds, but not on reflected sounds of a particular room. FIG. 6B shows an enlarged version of area 602B of FIG. 6A. This example is based on an RIR simulator that models the early reflections of the sound as a diffuse noise decaying over time according to a given reverberation time. In this example, the early reflections are not distinctive from the beginning and everything except the direct sound is modelled as a decaying diffuse noise.

Figure 7A:
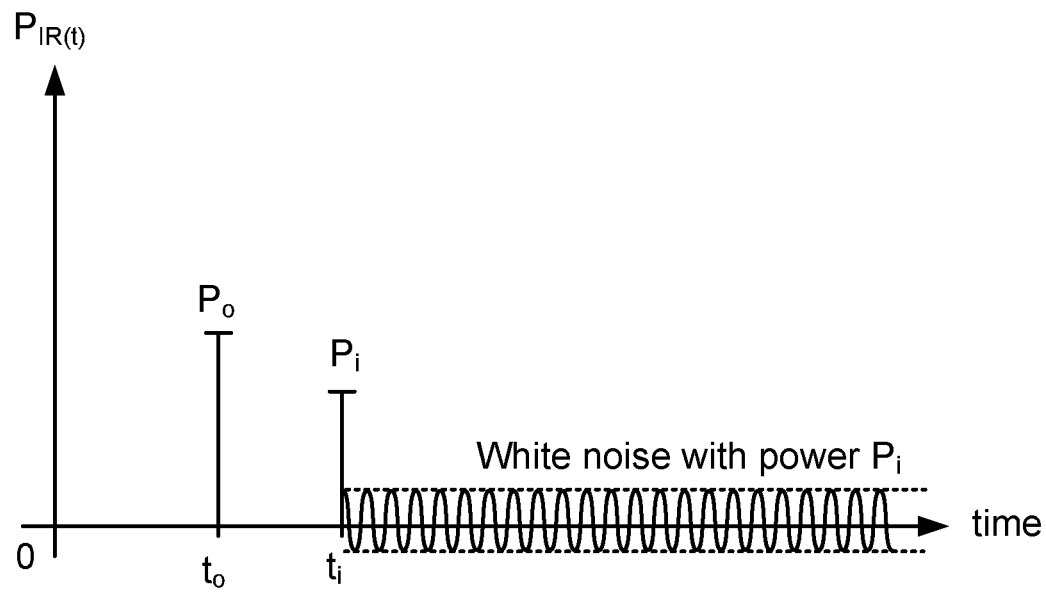
FIG. 7A is a graph that shows an example of how early reflections can be replaced by noise with the same power.

Examples of a simplified RIR based on direct sounds, but not on reflected sounds of a particular room, will now be described with reference to FIGS. 7A and 7B. FIG. 7A is a graph that shows an example of how early reflections can be replaced by noise with the same power. In FIG. 7A, $P_0$ represents the power of the direct sound, to represents the arrival time of the direct sound, $P_i$ represents the power of the early reflections and $t_i$ represents the arrival time of the first reflection.

According to some implementations, a simplified RIR simulator may be configured to replace the early reflections of RIRs shown in FIG. 6A with a random Gaussian white noise (see FIG. 6B) having power $P_n$ as illustrated in FIG. 7A. By replacing the early reflections by a random diffuse noise, the RIRs become less sensitive to a particular room's characteristics and can be generalized to a more generic type of room. The power of the white noise may, for example, be normalized using the power of the direct sound:

$$P_0 = a_0^2 = \frac{\gamma^2}{d_0^2} \qquad \text{Equation 5}$$

In Equation 5, $d_0$ represents the distance between the source (here, the talker's mouth) and the microphone(s), $a_0$ represents the energy of the direct sound and $P_0$ represents the power of the direct sound. The normalised power of the white noise (which is white Gaussian noise in some implementations) may be expressed as follows:

$$P_w = \frac{P_i}{P_0} = \frac{4\pi c}{V} d_0^2 \qquad \text{Equation 6}$$

In Equation 6, $P_w$ represents the power of the white noise and $P_i$ represents the power of the early reflections.

Figure 7B:
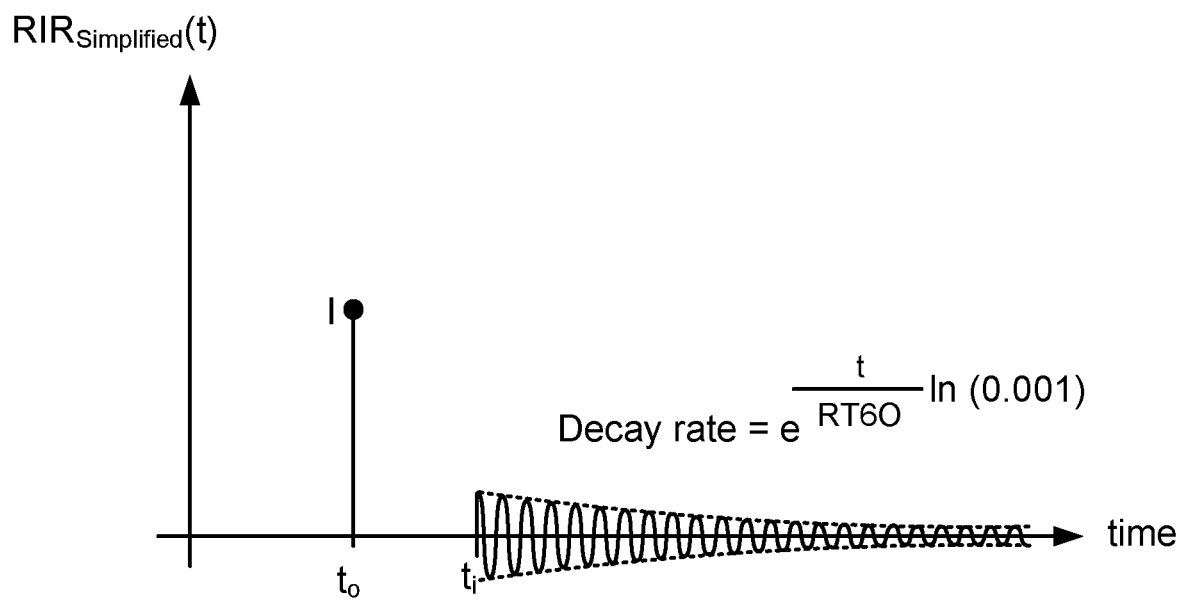
FIG. 7B is a graph that shows an example of applying a decay, based on reverberation time, to the graph shown in FIG. 7A.

FIG. 7B is a graph that shows an example of applying a decay, based on reverberation time, to the graph shown in FIG. 7A. Taking the reverberation of the room into account, the simplified room impulse response can be written as follows:

$$RIR_{simplified}(t) = \{\delta(t-t_0) + \sqrt{P_w}\, w(t)u(t-t_1)\} e^{\frac{t}{RT60} \ln(10^{-3})} \qquad \text{Equation 7}$$

In Equation 7, $RIR_{simplified}(t)$ represents the simplified room impulse response, where $w(t)$ represents the Gaussian white noise with power $P_w$, RT60 represents the reverberation time, and $t_0$ and $t_1$ represent the arrival times of the direct sound and the first echo, respectively. In Equation 7, $\delta(t-t_0)$ represents a Dirac delta function that has a non-zero value only for $t=t_0$ and $u(t-t_1)$ represents a unit step function that equals zero for $t<t_1$ and equals one for $t \geq t_1$.

Figure 8A:
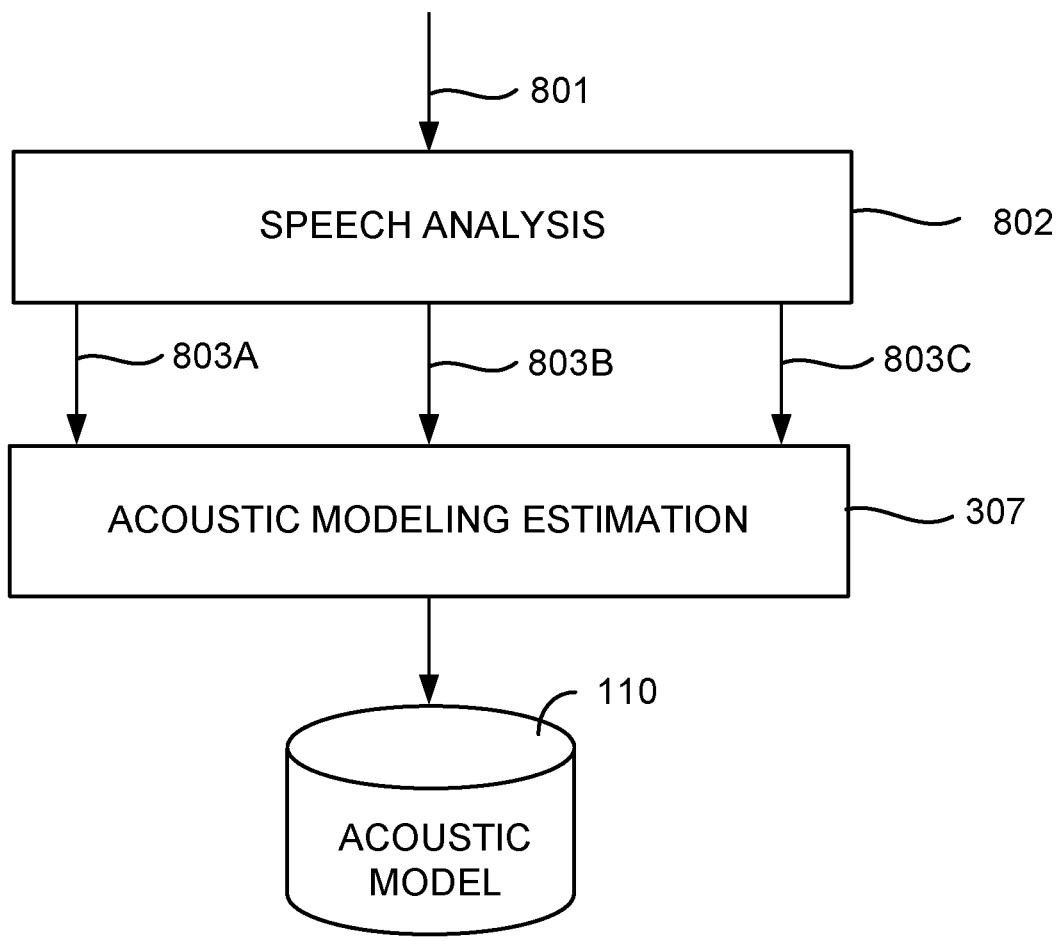
FIG. 8A shows examples of blocks of an alternative process of building acoustic models.

FIG. 8A shows examples of blocks of an alternative process of building acoustic models. The blocks of FIG. 8A may, for example, be implemented by control system (such as the control system 15) that includes one or more processors and one or more non-transitory memory devices. As with other figures disclosed herein, the numbers and types of the elements shown in FIG. 8A are merely made by way of example.

In FIG. 8A, the speech analysis block 802 is shown receiving a time-domain near-microphone speech signal 801. In this implementation, the speech analysis block 802 is configured to replicate the behavior of the reverberant speech signal by modifying the energies of near-microphone signals in various frequency bands. This process may be referred to herein as feature space multi-style acoustic modeling. Detailed examples of how the speech analysis block 802 may be implemented are described below with reference to FIGS. 8B-9B.

The acoustic modeling estimation block 307 may function substantially as described above with reference to FIG. 3. According to this example, the acoustic modeling estimation block 307 outputs the modified features 803A, 803B and 803C. In this example, the acoustic model 110 may be trained based on modified features 803A, 803B and 803C, as well as other modified features generated by the acoustic modeling estimation block 307.

Figure 8B:
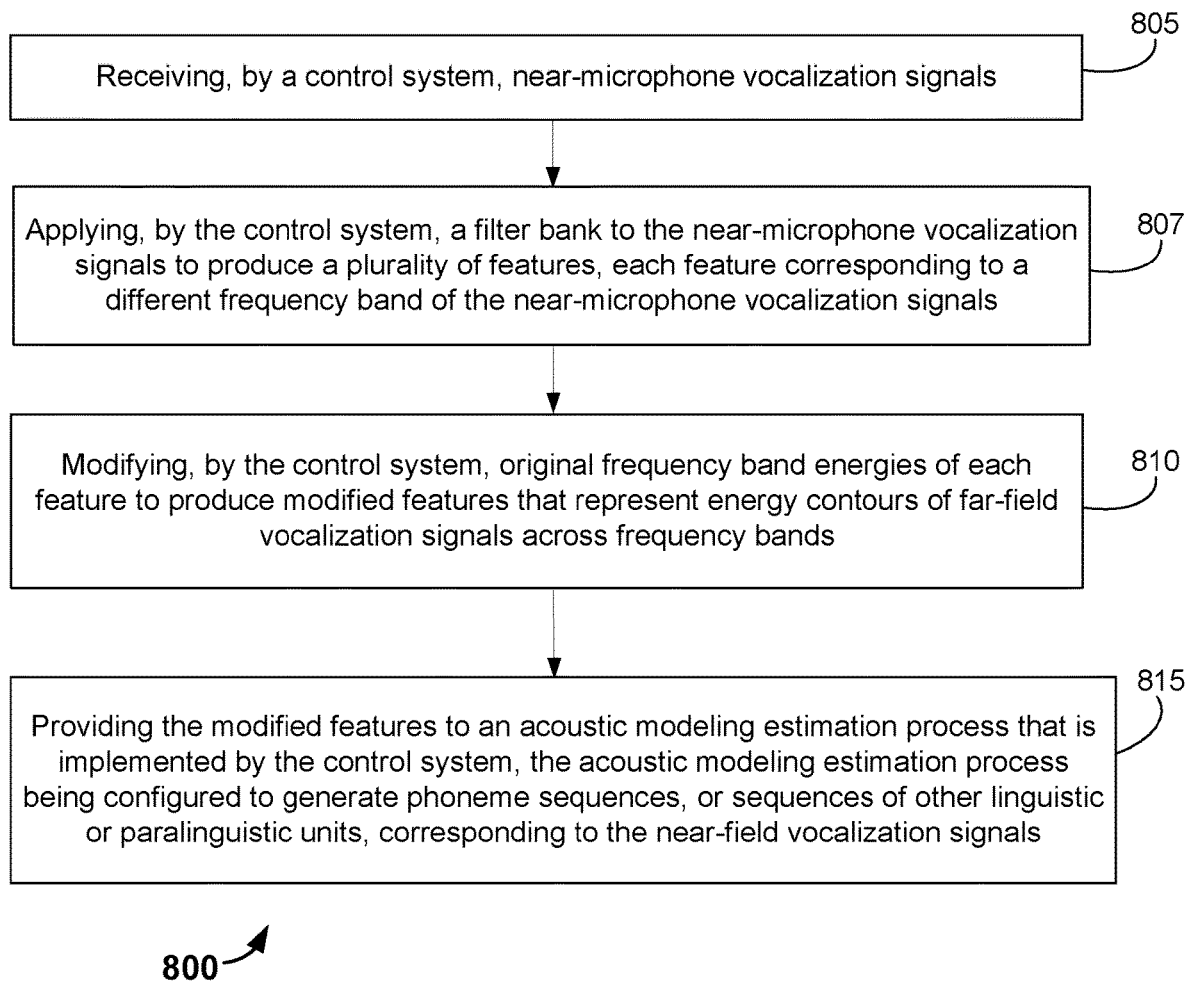
FIG. 8B is a flow diagram that shows blocks of a method that may be performed, at least in part, by the speech analysis block of FIG. 8A.

FIG. 8B is a flow diagram that shows blocks of a method that may be performed, at least in part, by the speech analysis block of FIG. 8A. The method 800 may, for example, be implemented by control system (such as the control system 15) that includes one or more processors and one or more non-transitory memory devices. In this example, block 805 involves receiving, by the control system, near-microphone vocalization signals.

Here, block 807 involves applying, by the control system, a filter bank to the near-microphone vocalization signals to produce a plurality of features. In this example, each feature corresponds to a different frequency band of the near-microphone vocalization signals.

According to this implementation, block 810 involves modifying, by the control system, original frequency band energies of each feature. In this example, block 810 involves producing modified features that represent energy contours of far-field vocalization signals across frequency bands. In some examples, block 810 may involve generating delayed and/or attenuated replicates of original frequency band energies of each feature and applying one or more addition operators to the delayed and attenuated replicates. Generating the attenuated replicates may, for example, involve determining a gain based on a reverberation time, a distance between a source and a microphone, a length of a time frame and/or a room size.

Here, block 815 involves providing the modified features to an acoustic modeling estimation process that is implemented by the control system. According to this example, the acoustic modeling estimation process is configured to generate phoneme sequences, or sequences of other linguistic or paralinguistic units, corresponding to the near-field vocalization signals.

Figure 9A:
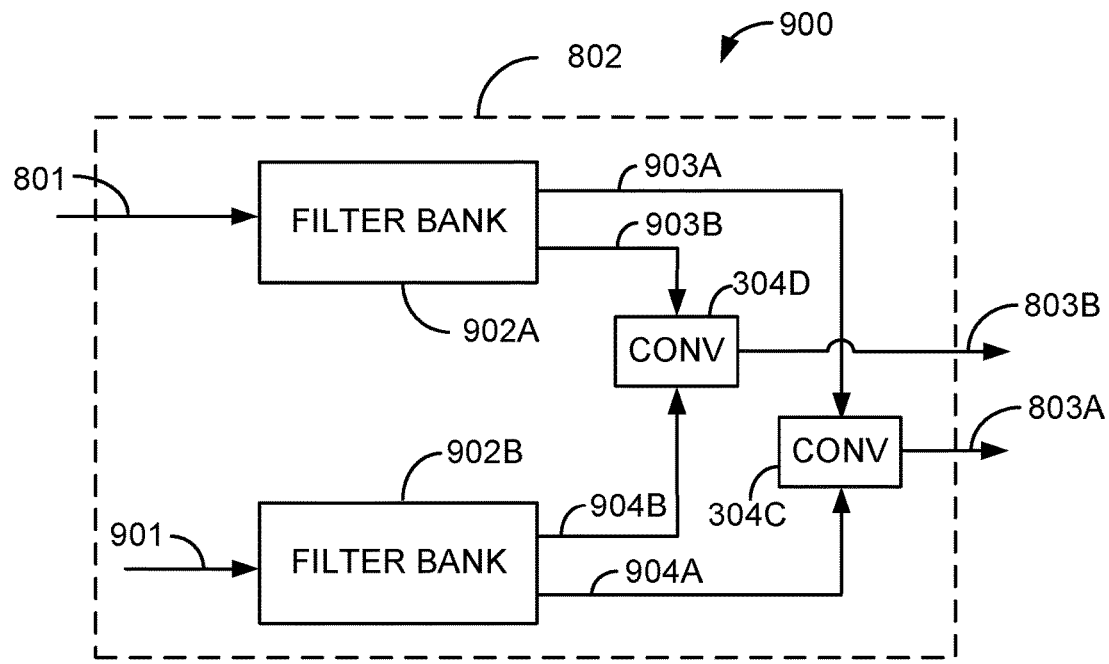
FIGS. 9A and 9B show examples of components that may be included in the speech analysis block of FIG. 8A.
Figure 9B:
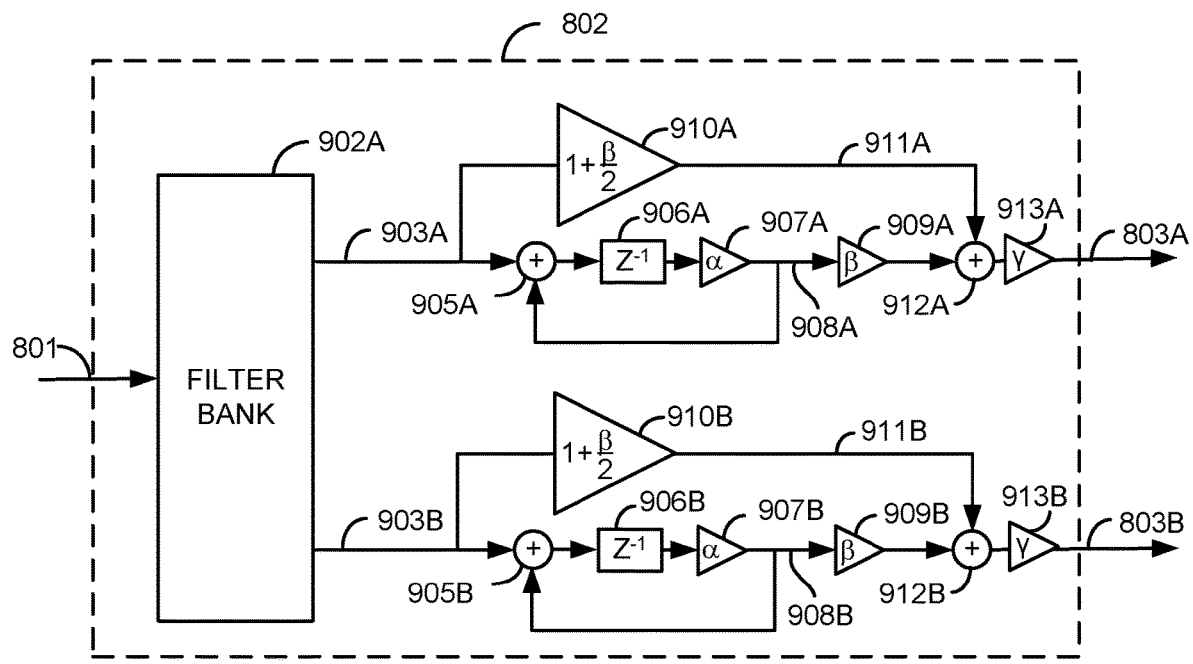

FIGS. 9A and 9B show examples of components that may be included in the speech analysis block of FIG. 8A. The blocks of FIGS. 9A and 9B may, for example, be implemented by control system (such as the control system 15) that includes one or more processors and one or more non-transitory memory devices. As with other figures disclosed herein, the numbers and types of the elements shown in FIGS. 9A and 9B are merely made by way of example. For example, other implementations may involve more frequency bands than are shown and described with reference to FIGS. 9A and 9B.

In these examples, the filter bank energies are modified to represent the energy contours of far-field speech signals across frequency bands. According to some such implementations, multi-style training may be directly applied in the feature domain rather than time-domain.

In FIG. 9A, the energy of the near-microphone speech signal in each filter band is convolved with the energy of the room impulse response in the corresponding band across time. Here, the filter bank 902A receives the time-domain near-microphone speech signal 801 and the filter bank 902B receives the room impulse response 901. Although not shown in FIG. 9A, the room impulse response 901 may be received from the room impulse response simulator 301 described above. The filter banks 902A and 902B may, in some examples, be instances of the same type of filter bank. In some implementations, the filter banks 902A and 902B may be mel scale filter banks.

According to this implementation, the filter bank 902A derives features 903A and 903B from the near-microphone speech signals 801, whereas the filter bank 902B derives features 904A and 904B from the room impulse response 901. In this example, the features 903A and 904A correspond to one frequency band and the features 903B and 904B correspond to another frequency band.

In this implementation, the convolution module 304C convolves the features 903A and 904A to produce the modified feature 803A. Similarly, the convolution module 304D convolves the features 903B and 904B to produce the modified feature 803B. The modified features 803A and 803B may, for example, correspond to the modified features 803A and 803B that are shown in FIG. 8A.

The convolution process of FIG. 9A may, in some implementations, be expanded as shown in FIG. 9B. In this example, parameters α and β determine the decay of delayed replicates of the original energy and the contributions of the original and delayed replicates in the modified energy each frequency band.

In FIG. 9B, as in FIG. 9A, the filter bank 902A derives features 903A and 903B from the near-microphone speech signals 801. The features 903A and 903B are passed to addition operators 905A and 905B, then to delay operators 906A and 906B and subsequently to gain blocks 907A and 907B. The gain blocks 907A and 907B apply a gain of α, which imparts a decay on the sum of the delayed replicates of the original energy signal in each frequency band.

The output of the gain blocks 907A and 907B is provided to the gain blocks 909A and 909B, which apply a gain of β in this example. Moreover, a copy of the output of gain blocks 907A and 907B reverts to the addition operators 905A and 905B. Accordingly, the addition operators 905A and 905B operate upon delayed and attenuated replicates of the original energy in each frequency band.

The output of the gain blocks 909A and 909B is provided to the summation blocks 912A and 912B. The output of the gain blocks 910A and 910B, which apply a gain of $(1+\beta/2)$ to the features 903A and 903B in this example, is also provided to the summation blocks 912A and 912B. According to this example, the output of the summation blocks 912A and 912B is provided to the scaling blocks 913A and 913B. Here, the scaling blocks 913A and 913B apply a scaling factor of γ in order to make the input and output levels (here, the level of the near-microphone speech signal 801 and the levels of the modified features 803A and 803B) equal, or substantially equal.

α, β and γ in FIG. 9B may, in some examples, be calculated as follows:

$$\alpha = \lambda^2, \text{ where } \lambda = (0.001)^{\frac{t_b}{RT60}} \quad \text{Equation 8}$$

$$\beta = 4\pi c \frac{t_b}{V} d_0^2 \quad \text{Equation 9}$$

$$\gamma = \frac{1-\alpha}{1+\frac{\beta}{2}+\alpha\left(-1+\frac{\beta}{2}\right)} \quad \text{Equation 10}$$

In Equation 8, $t_b$ represents the length of a time frame and RT60 represents the reverberation time. In Equation 9, $d_0$ represents the distance between the sound source and the microphone and V represents the volume of the room. For a cubic room $V=(3/2\,MFP)$. Therefore, for a cubic room β may be expressed as follows:

$$\beta = 4\pi c \frac{t_b}{\left(\frac{3}{2}MFP\right)^3} d_0^2 \quad \text{Equation 11}$$

In Equation 11, MFP represents size of the room in terms of mean free path. For example, for a time frame of $t_b=20$ ms, RT60=250 ms, $d_0^2=1\,m^2$ and a cubic room with MFP=3 m or V=91.25 $m^3$, α=0.33, β=0.94, and γ=0.52.

Following is an explanation of how Equations 8-10 may be derived. As noted above, the filter bank 902B of FIG. 9A derives the features 904A and 904B from the room impulse response 901. For the feature-space multistyle training of FIGS. 9A and 9B, one may calculate the energy per time frame of the features 904A and 904B as follows:

$$E_{frame} = P_n \times t_b \quad \text{Equation 12}$$

As noted above with reference to Equation 4, $P_n$ represents the power at a point in a room. In Equation 12 $t_b$ represents the frame length, which is expressed in seconds in this example.

Normalising by the direct power, $P_0$ (see Equation 5), the normalised energy per time frame can be written as follows:

$$E_{norm_{frame}} = P_n \times t_b \times \frac{d0^2}{\gamma^2} \quad \text{Equation 13}$$

Applying a reverberation energy decay of $$e^{\left(\frac{tb}{RT60}ln(10^{-3})\right)^2}$$

to Equation 13 results in the normalised reverbed energy across frames:

$$E_{norm_{reverbed\,frame}} = P_n \times t_b \times \frac{d0^2}{\gamma^2} \times e^{\left(\frac{tb}{RT60}ln(10^{-3})\right)^2} \quad \text{Equation 14}$$

The energy contours of the modified features 803A (see FIG. 9A) can be estimated as the convolution of Equation 14 and $E_{s_{frame}}(k)$, the energy of the speech signal across frames in filter band k (e.g., the features 903A that are derived by the filter bank 902A):

$$E_{conv}(k) = E_{norm_{reverbed\,frame}}(k) * E_{s_{frame}}(k) \quad \text{Equation 15}$$

After expanding the convolution of Equation 15 across time frames, α and β be expressed as shown in Equations 8 and 9. In some instances a may vary from one frequency band to another: the value of RT60 may be different in low and high frequencies, because sound amplitudes decay relatively faster in high frequencies.

After Equations 8 and 9 have been derived, the value of the scaling factor γ may be expressed in terms of α and β. As noted above, the scaling factor γ is applied to make the input and output levels of the speech analysis block 802 equal. Accordingly, the scaling factor γ may be derived by determining the gains that are applied along the two paths in FIG. 9B that lead to the summation block 912A, then determining γ in terms of α and β such that when γ is applied to the output of the summation block 912A, the level of the resulting signal (e.g., the level of the modified features 803A) is equal to the level of the level of the near-microphone speech signal 801. The result is Equation 10.

Figure 10A:
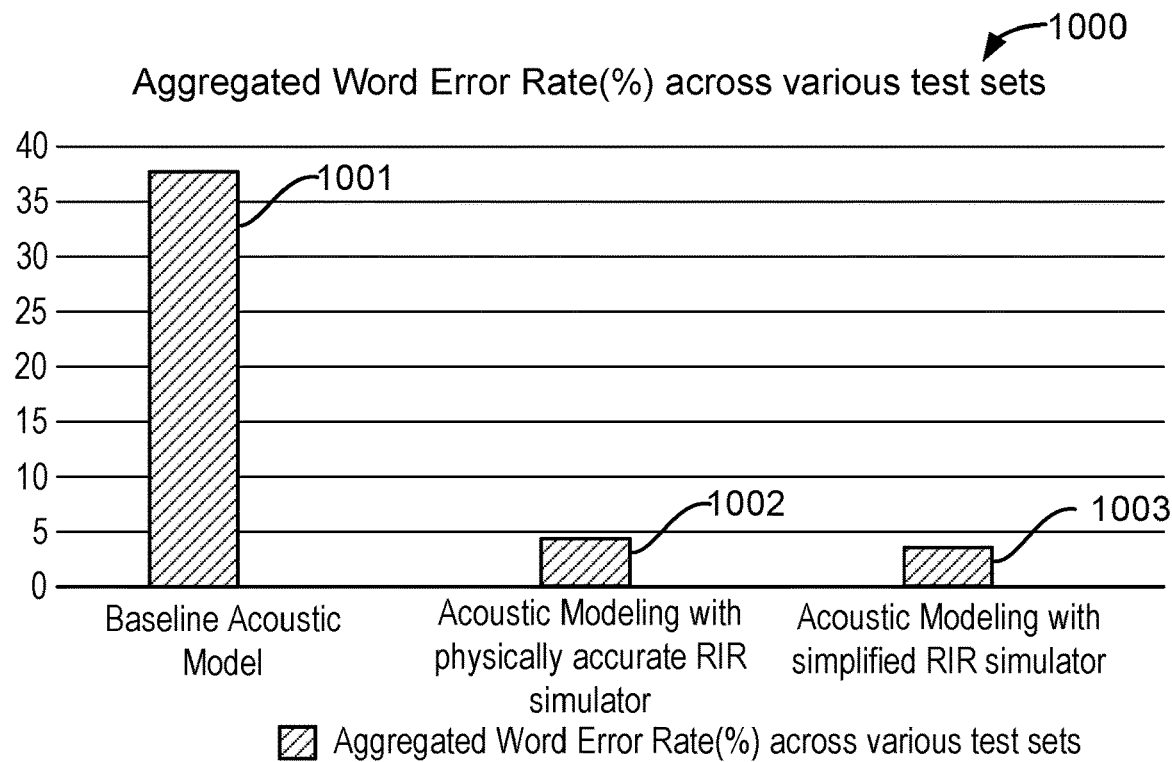
FIG. 10A is a bar chart that compares the performance of automatic speech recognition (ASR) systems having different acoustic models.

FIG. 10A is a bar chart that compares the performance of automatic speech recognition (ASR) systems having different acoustic models. The performance of a speech recognition system (such as that of FIG. 1) in terms of word error rate is shown in FIG. 10A. One acoustic model was obtained using a physically accurate RIR simulator like that described above with reference to FIGS. 5A and 5B. Another acoustic model was obtained using a simplified RIR simulators like that described above with reference to FIGS. 6A-9B. In FIG. 10, the results of the ASR systems with the above acoustic models are compared with a "baseline" system using an acoustic model trained only on near-microphone speech signals. The training data set for these examples included 200 vectors of digit sequences spoken by a single talker. The test data sets were recorded in three different room environments (office cube, medium and large meeting rooms) with 200 test vectors of digit sequences (different from the training data set) uttered by the same talker.

The results of these three test data sets were aggregated for the graph shown in FIG. 10A. It may be seen that both the ASR based on an acoustic model that was obtained using the original RIR simulator and the ASR based on an acoustic model that was obtained using the simplified RIR simulator dramatically outperformed the ASR based on the baseline acoustic model. Moreover, the ASR based on an acoustic model that was obtained using the simplified RIR simulator outperformed the ASR based on an acoustic model that was obtained using the original RIR simulator.

Figure 10B:
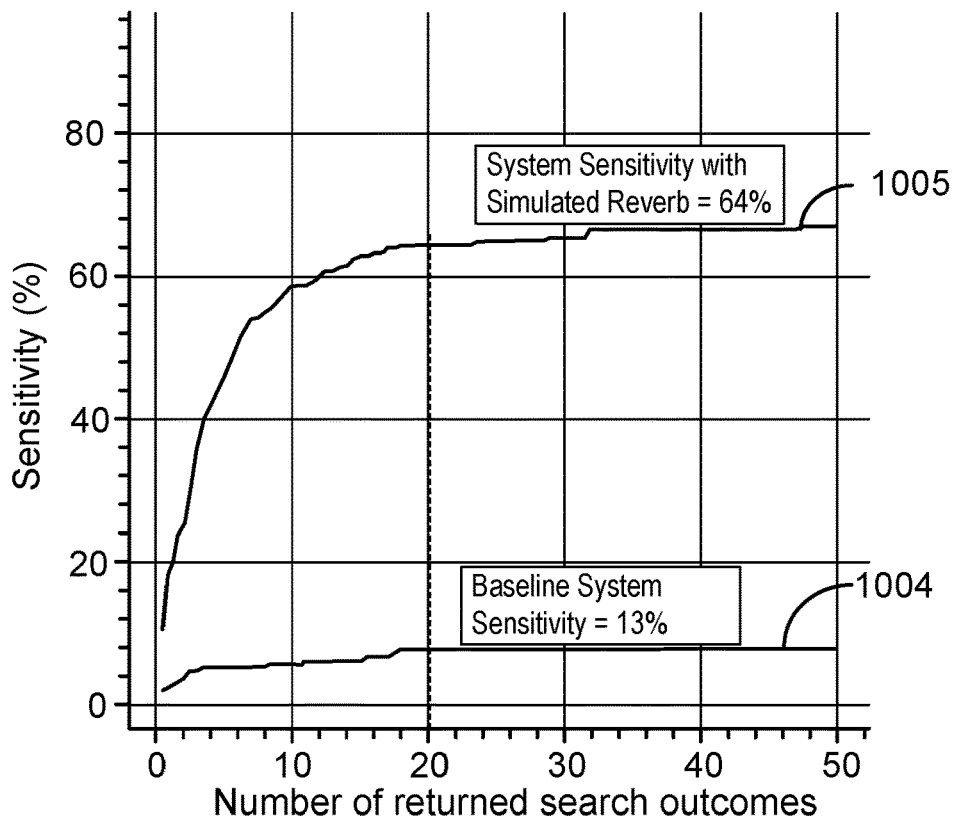
FIG. 10B is a graph that compares the sensitivity of baseline and proposed acoustic models for an audio search task.

FIG. 10B is a graph that compares the sensitivity of baseline and proposed acoustic models for an audio search task. In this example, the comparison is with reference to a spoken term detection ("audio search") task based on far field speech signals. The performance measure of $$\text{sensitivity} = \frac{TP}{TP+FN}$$

is used to compare the above acoustic models. TP indicates the number of true positive cases where the returned search outcomes were aligned with the human-transcribed text, or in other words the number of outcomes that were returned correctly based on a human reference transcript. FN indicates the number of returned outcomes that were not correspondent to the human-transcribed text, or in other words the number of outcomes that were returned incorrectly based on a human reference transcript. In this particular example 300 queries (manually generated) were selected and they were searched in a Dolby meeting recorded on a Dolby® Conference Phone (DCP). The sensitivities of the above systems were evaluated as the number of returned search outcomes was increased from one to 100 returned search outcomes. It can be seen in FIG. 10B that one of the disclosed acoustic models has increased the absolute sensitivity by 51% when the number of returned results were forty or more.

Figure 11:
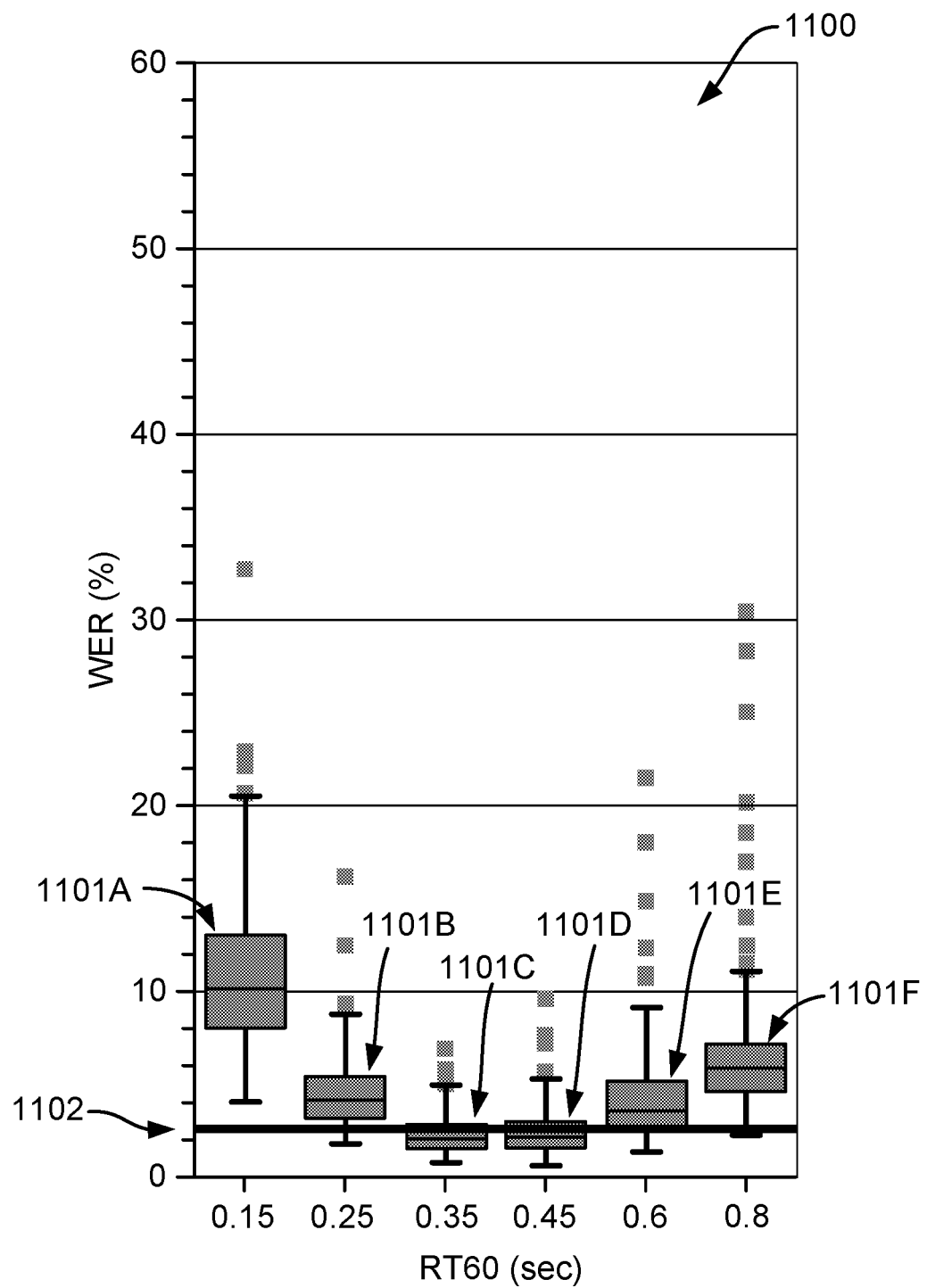
FIG. 11 compares the performance of ASRs based on a single acoustic model and multiple acoustic models.

FIG. 11 compares the performance of ASRs based on a single acoustic model and multiple acoustic models. The training and test datasets were the same as those described above with reference to FIG. 10A. The inventors built 639 acoustic models based on various combinations of acoustic parameters described with reference to FIG. 4 and calculated the performance of each model tested on three data sets.

In these examples, the performance of the system was measured in terms of word error rate (WER). In FIG. 11, 1101A, 1101B, 1101C, 1101D, 1101E and 1101F are box plots of ASR performance of specific acoustic models trained on vectors with RT60 s of 0.15 s, 0.25 s, 0.35 s, 0.45 s, 0.6 s, and 0.8 s, respectively. The grey box shows the interquartile range and the line enclosed in the grey box shows the median. The line 1002 indicates the mean performance of the general acoustic model trained on 200 randomly-selected vectors generated by a variety of acoustic parameters that included distance, room size and reverberation time.

The inventors observed that the most significant factor affecting the performance was reverberation time, which means if one were to build acoustic models for small, medium, large meeting rooms, one would only need to modify the reverberation time between models in order to provide acceptable results.

The inventors also observed the performance of a system with a single acoustic model trained on randomly-selected simulated vectors (a combination of various distances to the microphone, room sizes and reverberation times). This system's mean performance is shown in FIG. 11 as the line 1102. Accordingly, this system's mean performance was comparable with that of the best acoustic models with specific reverberation times: in the example shown in FIG. 11, the best results are represented by 1101C and 1101D, which produced a WER of approximately 2%. This means that in order to achieve a high performance for speech recognition in meeting conditions, having a single acoustic model trained on an appropriate distribution of reverberation times is sufficient.

The general principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Various aspects of the present invention may be appreciated from the following enumerated example embodiments (EEEs):

1. A computer-implemented audio processing method, comprising:
   training, by a control system that comprises one or more processors and one or more non-transitory memory devices, an acoustic model for a far-field vocalization processing system, the acoustic model configured to map an input audio signal into linguistic or paralinguistic units, wherein the training involves imparting far-field acoustic characteristics upon near-field training vectors, wherein the near-field training vectors comprise a plurality of near-microphone vocalization signals, and wherein imparting the far-field acoustic characteristics involves:
      generating, by the control system, a plurality of simulated room models, wherein the generating involves simulating diffuse room reverberation but not simulating individual early reflections from room surfaces; and
      imparting, via the control system, one or more of the simulated room models on the near-field training vectors, to produce a plurality of simulated far-field vocalization signals; and
   saving the results of the training in one or more non-transitory memory devices corresponding with the acoustic model.

2. The audio processing method of EEE 1, wherein the room models comprise room impulse responses and wherein the imparting involves time-domain convolution of the impulse responses with the near-field training vectors.

3. The audio processing method of EEE 1, wherein the room models comprise room impulse responses and wherein the imparting involves frequency-domain convolution of the impulse responses with the near-field training vectors.

4. The audio processing method of EEE 1, wherein imparting the far-field acoustic characteristics involves:
receiving, by the control system, near-microphone vocalization signals;
applying, by the control system, a filter bank to the near-microphone vocalization signals to produce a plurality of features, each feature corresponding to a different frequency band of the near-microphone vocalization signals;
modifying, by the control system, original frequency band energies of each feature to produce modified features that represent energy contours of far-field vocalization signals across frequency bands; and providing the modified features to an acoustic modeling estimation process that is implemented by the control system, the acoustic modeling estimation process being configured to generate phoneme sequences, or sequences of other linguistic or paralinguistic units, corresponding to the near-field vocalization signals.

5. The audio processing method of EEE 4, wherein the modifying involves:
generating delayed and attenuated replicates of original frequency band energies of each feature; and
applying one or more addition operators to the delayed and attenuated replicates.

6. The audio processing method of EEE 5, wherein generating the attenuated replicates involves determining a gain based on one or more factors selected from a list of factors consisting of a reverberation time, a distance between a source and a microphone, a length of a time frame and a room size.

7. The audio processing method of any one of EEEs 4-6, wherein the modifying involves applying one or more delay operators to original frequency band energies of each feature.

8. The audio processing method of any one of EEEs 1-7, wherein generating the simulated room models involves simulating room impulse responses corresponding to a diffuse sound that decays over time according to a reverberation time.

9. The audio processing method of any one of EEEs 1-8, wherein the far-field vocalization processing system comprises one or more of a far-field speech recognition system, a far-field speaker recognition system, a wakeword detection system, and an emotion recognition system.

10. The audio processing method of any one of EEEs 1-9, wherein training the acoustic model comprises:
extracting, via a speech analysis process implemented by the control system, features from the simulated far-field vocalization signals; and
providing extracted features to an acoustic modeling estimation process configured to generate phoneme sequences, or sequences of other linguistic or paralinguistic units, corresponding to the simulated far-field vocalization signals.

11. The audio processing method of EEE 10, wherein the control system implements the acoustic modeling estimation process according to one or more of: a Hidden Markov model, a Gaussian mixture model or a neural network.

12. The audio processing method of any one of EEEs 1-11, wherein training the acoustic model comprises changing a physical state of at least one non-transitory memory device location corresponding with a near-field training vector.

13. The audio processing method of any one of EEEs 1-12, wherein the far-field vocalization processing system comprises a far-field speech recognition system, further comprising implementing the far-field speech recognition system by:
implementing, via the control system, an acoustic model trained according to any one of EEEs 1-12;
implementing, via the control system, a pronunciation model by mapping linguistic units produced by the acoustic model into words according to a pronunciation dictionary; and
implementing, via the control system, a language model by estimating a probability of a word given a previous word sequence produced by the pronunciation model.

14. The audio processing method of EEE 13, wherein implementing the far-field speech recognition system further comprises:
receiving, by the control system, far-field speech; and
producing, via the control system, a transcript corresponding to the far-field speech.

15. The audio processing method of any one of EEEs 1-14, wherein the far-field vocalization processing system comprises one or more of a far-field talker recognition system, a wakeword detection system or an emotion recognition system, further comprising implementing the far-field vocalization processing system by implementing, via the control system, an acoustic model trained according to any one of EEEs one of EEEs 1-14.

16. A non-transitory storage medium having software stored thereon, the software including instructions for controlling one or more processors to perform the audio processing method of any one of EEEs 1-15.

17. An apparatus, comprising:
an interface system; and
a control system that comprises one or more processors and one or more non-transitory memory devices, the control system being configured to perform the audio processing method of any one of EEEs 1-15.

18. An apparatus, comprising:
an interface system; and
a control system comprising one or more processors and one or more non-transitory storage media operatively coupled to the one or more processors, the control system configured to implement an acoustic model trained according to any one of the methods recited in EEEs 1-15, wherein the control system is further configured for implementing a far-field speech recognition system by:
receiving, via the interface system, an audio signal corresponding to far-field speech;
mapping, via the acoustic model, the audio signal into phonemes;
mapping, via a pronunciation model and a language model, the phonemes into words; and
outputting a representation of the words.

The invention claimed is:

1. A computer-implemented audio processing method, comprising:
training, by a control system that comprises one or more processors and one or more non-transitory memory devices, an acoustic model for a far-field vocalization processing system, the acoustic model configured to map an input audio signal into linguistic or paralinguistic units, wherein the training involves imparting far-field acoustic characteristics upon near-field training vectors, wherein the near-field training vectors comprise a plurality of near-microphone vocalization signals, and wherein imparting the far-field acoustic characteristics involves:

generating, by the control system, a plurality of simulated room models, wherein the generating involves simulating diffuse room reverberation but not simulating individual early reflections from room surfaces; and imparting, via the control system, one or more of the simulated room models on the near-field training vectors, to produce a plurality of simulated far-field vocalization signals; and saving the plurality of simulated far-field vocalization signals of the training in one or more non-transitory memory devices corresponding with the acoustic model.

2. The audio processing method of claim 1, wherein the room models comprise room impulse responses and wherein the imparting involves time-domain convolution of the impulse responses with the near-field training vectors.

3. The audio processing method of claim 1, wherein the room models comprise room impulse responses and wherein the imparting involves frequency-domain convolution of the impulse responses with the near-field training vectors.

4. The audio processing method of claim 1, wherein imparting the far-field acoustic characteristics involves:
receiving, by the control system, near-microphone vocalization signals;
applying, by the control system, a filter bank to the near-microphone vocalization signals to produce a plurality of features, each feature corresponding to a different frequency band of the near-microphone vocalization signals;
modifying, by the control system, original frequency band energies of each feature to produce modified features that represent energy contours of far-field vocalization signals across frequency bands; and
providing the modified features to an acoustic modeling estimation process that is implemented by the control system, the acoustic modeling estimation process being configured to generate phoneme sequences, or sequences of other linguistic or paralinguistic units, corresponding to the near-field vocalization signals.

5. The audio processing method of claim 4, wherein the modifying involves:
generating delayed and attenuated replicates of original frequency band energies of each feature; and
applying one or more addition operators to the delayed and attenuated replicates.

6. The audio processing method of claim 5, wherein generating the attenuated replicates involves determining a gain based on one or more factors selected from a list of factors consisting of a reverberation time, a distance between a source and a microphone, a length of a time frame and a room size.

7. The audio processing method of claim 4, wherein the modifying involves applying one or more delay operators to original frequency band energies of each feature.

8. The audio processing method of claim 1, wherein generating the simulated room models involves simulating room impulse responses corresponding to a diffuse sound that decays over time according to a reverberation time.

9. The audio processing method of claim 1, wherein the far-field vocalization processing system comprises one or more of a far-field speech recognition system, a far-field speaker recognition system, a wakeword detection system, and an emotion recognition system.

10. The audio processing method of claim 1, wherein training the acoustic model comprises:

extracting, via a speech analysis process implemented by the control system, features from the simulated far-field vocalization signals; and
providing extracted features to an acoustic modeling estimation process configured to generate phoneme sequences, or sequences of other linguistic or paralinguistic units, corresponding to the simulated far-field vocalization signals.

11. The audio processing method of claim 10, wherein the control system implements the acoustic modeling estimation process according to one or more of: a Hidden Markov model, a Gaussian mixture model or a neural network.

12. The audio processing method of claim 1, wherein training the acoustic model comprises changing a physical state of at least one non-transitory memory device location corresponding with a near-field training vector.

13. The audio processing method of claim 1, wherein the far-field vocalization processing system comprises a far-field speech recognition system, further comprising implementing the far-field speech recognition system by:
implementing, via the control system, the acoustic model;
implementing, via the control system, a pronunciation model by mapping linguistic units produced by the acoustic model into words according to a pronunciation dictionary; and
implementing, via the control system, a language model by estimating a probability of a word given a previous word sequence produced by the pronunciation model.

14. The audio processing method of claim 13, wherein implementing the far-field speech recognition system further comprises:
receiving, by the control system, far-field speech; and
producing, via the control system, a transcript corresponding to the far-field speech.

15. The audio processing method of claim 1, wherein the far-field vocalization processing system comprises one or more of a far-field talker recognition system, a wakeword detection system or an emotion recognition system, further comprising implementing the far-field vocalization processing system by implementing, via the control system, the acoustic model.

16. A non-transitory storage medium having software stored thereon, the software including instructions for controlling one or more processors to perform the audio processing method of claim 1.

17. An apparatus, comprising:
an interface system; and
a control system that comprises one or more processors and one or more non-transitory memory devices, the control system being configured to perform the audio processing method of claim 1.

18. An apparatus, comprising:
an interface system; and
a control system comprising one or more processors and one or more non-transitory storage media operatively coupled to the one or more processors, the control system configured to implement an acoustic model trained according to the method of claim 1, wherein the control system is further configured for implementing a far-field speech recognition system by:
receiving, via the interface system, an audio signal corresponding to far-field speech;
mapping, via the acoustic model, the audio signal into phonemes;
mapping, via a pronunciation model and a language model, the phonemes into words; and
outputting a representation of the words.

* * * * *